(12) United States Patent
Lee et al.

(10) Patent No.: US 12,479,950 B2
(45) Date of Patent: Nov. 25, 2025

(54) ANIONIC POLYMERIZATION INITIATOR, ANIONIC POLYMERIZATION INITIATOR COMPOSITION, AND PRODUCTION METHOD THEREFOR

(71) Applicant: LG Chem, Ltd., Seoul (KR)

(72) Inventors: Hyun Mo Lee, Daejeon (KR); Seok Pil Sa, Daejeon (KR); Eun Ji Shin, Daejeon (KR); Ki Soo Lee, Daejeon (KR); Bun Yeoul Lee, Gyeonggi-do (KR); Tae Jin Kim, Chungcheongnam-do (KR)

(73) Assignee: LG Chem, Ltd., Seoul (KR)

( * ) Notice: Subject to any disclaimer, the term of this patent is extended or adjusted under 35 U.S.C. 154(b) by 552 days.

(21) Appl. No.: 17/761,007

(22) PCT Filed: Jan. 29, 2021

(86) PCT No.: PCT/KR2021/001243
§ 371 (c)(1),
(2) Date: Mar. 16, 2022

(87) PCT Pub. No.: WO2021/162304
PCT Pub. Date: Aug. 19, 2021

(65) Prior Publication Data
US 2023/0002535 A1    Jan. 5, 2023

(30) Foreign Application Priority Data
Feb. 14, 2020  (KR) .................. 10-2020-0018352

(51) Int. Cl.
C08F 297/02    (2006.01)
C08F 4/48    (2006.01)
C08F 4/659    (2006.01)
C08F 212/08    (2006.01)

(52) U.S. Cl.
CPC ................... C08F 297/02 (2013.01)

(58) Field of Classification Search
CPC ...... C08F 297/02; C08F 4/65908; C08F 4/48; C08F 212/08
See application file for complete search history.

(56) References Cited

U.S. PATENT DOCUMENTS 3,769,345 A    10/1973  Langer
5,543,458 A     8/1996  Hoxmeier et al.
(Continued)

FOREIGN PATENT DOCUMENTS

EP    0870776 A2    10/1998
JP    H10-152541 A    6/1998
(Continued)

OTHER PUBLICATIONS

Search Report from International Application No. PCT/KR2021/001243, mailed May 20, 2021.
(Continued)

*Primary Examiner* — Catherine S Branch
(74) *Attorney, Agent, or Firm* — Lerner David LLP

(57) ABSTRACT

The present invention relates to an anionic polymerization initiator represented by Formula 1 below for producing a polyolefin-polystyrene block copolymer, an anionic polymerization initiator composition, and a production method therefor,

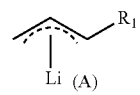

[Formula 1]

wherein $R_1$, and A are described herein.

2 Claims, 14 Drawing Sheets

(56) References Cited

U.S. PATENT DOCUMENTS

| | | | |
|---|---|---|---|
| 2001/0003726 A1 | 6/2001 | Marchal et al. | |
| 2018/0022852 A1 | 1/2018 | Lee et al. | |
| 2019/0016842 A1 | 1/2019 | Kamei et al. | |
| 2019/0161566 A1 | 5/2019 | Layman, Jr. | |
| 2020/0031978 A1 | 1/2020 | Lee et al. | |

FOREIGN PATENT DOCUMENTS

| | | |
|---|---|---|
| JP | H10-512916 A | 12/1998 |
| JP | 2018-505945 A | 3/2018 |
| KR | 101657925 B1 | 9/2016 |
| KR | 101732418 B1 | 5/2017 |
| KR | 101829382 B1 | 2/2018 |
| KR | 101848781 B1 | 4/2018 |
| KR | 20190004710 A | 1/2019 |
| TW | 201726755 A | 8/2017 |
| WO | 2013146253 A1 | 10/2013 |

OTHER PUBLICATIONS

Kim, D. H., et al., "Preparation of polystyrene-polyolefin multiblock copolymers by sequential coordination and anionic polymerization." RSC Advances, Jan. 18, 2017, vol. 7, No. 10, pp. 5948-5956.

Kim, C. S., et al., "Polystyrene Chain Growth from Di-End-Functional Polyolefins for Polystyrene-Polyolefin-Polystyrene Block Copolymers." Polymers, Oct. 2, 2017, vol. 9, 481, pp. 1-14.

Peinado, et al., "Effects of ozone in surface modification and thermal stability of SEBS block copolymers." Polymer Degradation and Stability, vol. 95, available online Mar. 31, 2010, pp. 975-986.

Ning, et al., "Synthesis of Amphiphilic Block-Graft Copolymers [Poly(styrene-b-ethylene-co-butylene-b-styrene)-g-Poly (acrylic acid)[and Their Aggregation in Water." Journal of Polymer Science: Part A: Polymer Chemistry, vol. 40, Jan. 18, 2002, pp. 1253-1266.

Kim, S.D. et al., "Peroxide-Mediated Alkyl-Alkyl Coupling of Dialkylzinc: A Useful Tool for Synthesis of ABA-Type Olefin Triblock Copolymers," Macromolecules, Jun. 2018, 8 Pages, American Chemical Society.

De Rosa, C. et al., "Expanding the Origin of Stereocontrol in Propene Polymerization Catalysis," ACS Catalysis, May 2016, pp. 3767-3770, American Chemical Society.

Jeon, J.Y. et al., "Synthesis of Polyolefin-block-polystyrene Through Sequential Coordination and Anionic Polymerizations," Journal of Polymer Science: Polymer Chemistry, Jun. 2016, pp. 1-9.

Smith W. Novis: "Synthetic Aspects of Tertiary Diamine Organolithium Complexes" In: "Suspensions: Fundamentals and Applications in the Petroleum Industry", Jun. 1, 1974 (Jun. 1, 1974), American Chemical Society, Washington, DC, XP055963143, vol. 130, pp. 23-55.

Extended European Search Report for Appl No. 21752933.8 dated Oct. 25, 2022. 9 pgs.

After quenching with D$_2$O

— before styrene polymerization
— after styrene polymerization (a)

(b)

(c)

(b)

ANIONIC POLYMERIZATION INITIATOR, ANIONIC POLYMERIZATION INITIATOR COMPOSITION, AND PRODUCTION METHOD THEREFOR

CROSS-REFERENCE TO RELATED APPLICATIONS

The present application is a national stage entry under U.S.C. § 371 of International Application No. PCT/KR2021/001243 filed on Jan. 29, 2021, which claims priority from Korean Patent Application No. 10-2020-0018352 filed on Feb. 14, 2020, all the disclosures of which are incorporated herein by reference.

TECHNICAL FIELD

The present invention relates to an anionic polymerization initiator, an anionic polymerization initiator composition, and a production method therefor, and more specifically, relates to an anionic polymerization initiator for producing a polyolefin-polystyrene block copolymer, an anionic polymerization initiator composition, and a production method therefor.

BACKGROUND ART

Currently, a market of hundreds of thousands of tons worldwide is formed for polyolefin-polystyrene block copolymers such as styrene-ethylene/butylene-styrene (SEBS) or styrene-ethylene/propylene-styrene (SEPS). Moreover, these block copolymers have the advantage that heat resistance and light resistance are excellent compared to styrene-butadiene-styrene (SBS) or styrene-isoprene-styrene (SIS), and are used as a material for a soft and strong touch feeling of a grip and a handle, an elastic material of a diaper, an oil gel used in medical and communication materials, an impact modifier for an engineering plastic, a flexibilizer or toughener of transparent polypropylene, or the like. SEBS in the related art is produced through a two-step reaction in which SBS obtained by anionic polymerization of styrene and butadiene is subjected to a hydrogenation reaction. SEPS in the related art is also produced through a two-step reaction in which SIS obtained by anionic polymerization of styrene and isoprene is subjected to a hydrogenation reaction. As described above, the process of saturating all of double bonds included in a main chain of a polymer through a hydrogenation reaction has a high process cost, and thus the unit costs of SEBS and SEPS are significantly higher than those of SBS and SIS before the hydrogenation reaction. This may serve as a limit to market expansion. Furthermore, since it is virtually impossible to saturate all of double bonds in a chain of a polymer through a hydrogenation reaction, commercially available SEBS and SEPS include some residual double bonds, and the presence thereof often causes a problem (Journal of Polymer Science: Part A: Polymer Chemistry, 2002, 40, 1253; and Polymer Degradation and Stability, 2010, 95, 975).

Accordingly, a technology for producing a polyolefin-polystyrene diblock copolymer from olefin or styrene monomers through a one-pot process has been developed (registered patent No. 1657925). According to the technology, coordinative chain transfer polymerization (CCTP) can uniformly grow a PO chain by adding an excessive amount of a chain transfer agent (CTA, for example, $Et_2Zn$) using a transition metal-based catalyst capable of polymerizing either or both of ethylene and α-olefin, and can synthesize a polyolefin-polystyrene block copolymer by anionic polymerization of styrene. Here, as an initiator for the anionic polymerization of styrene, alkyl lithium and amine ligand are added.

The inventors of the present invention have found that when an anionic initiator having a new structure is used as an initiator for the anionic polymerization of styrene, a PS chain can be more efficiently grown from a PO chain, and the growth range of the PS chain can be expanded, thereby completing the present invention.

DISCLOSURE OF THE INVENTION

Technical Problem

An object to be achieved in the present invention is to provide a novel anionic polymerization initiator.

Another object to be achieved in the present invention is to provide a novel anionic polymerization initiator composition.

Still another object to be achieved in the present invention is to provide a method for producing the novel anionic polymerization initiator.

Technical Solution

In order to achieve the above object, the present invention provides an anionic polymerization initiator represented by Formula 1 below:

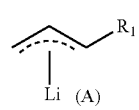

[Formula 1]

in Formula 1,
$R_1$ is hydrogen or a hydrocarbon group having 1 to 20 carbon atoms, and
A is represented by Formula 2 below,

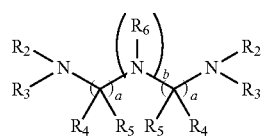

[Formula 2]

in Formula 2,
$R_2$ to $R_6$ are each independently a hydrocarbon group having 1 to 20 carbon atoms, and
a and b are each independently an integer of 0 to 3, and a and b are not 0 at the same time.

Moreover, in order to achieve the above another object, the present invention provides an anionic polymerization initiator composition containing a compound represented by Formula 2 below and a compound represented by Formula 5 below.

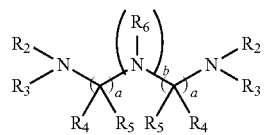

[Formula 2]

B—Li [Formula 5]

In Formula 2,
R₂ to R₆ are each independently a hydrocarbon group having 1 to 20 carbon atoms, and
a and b are each independently an integer of 0 to 3, and a and b are not 0 at the same time; and
in Formula 5,
B is alkyl having 1 to 20 carbon atoms.

Furthermore, in order to achieve the above still another object, the present invention provides a method for producing the anionic polymerization initiator, the method including a process of adding a compound represented by Formula 5 below and a compound represented by Formula 2 below in the presence of a compound represented by Formula 6 below.

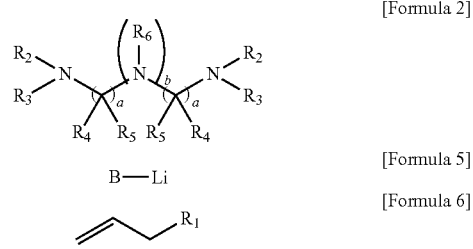
[Formula 2]

B—Li [Formula 5]

[Formula 6]

In the formulae,
$R_1$ to $R_6$ are each independently hydrogen or a hydrocarbon group having 1 to 20 carbon atoms;
a and b are each independently an integer of 0 to 3, and a and b are not 0 at the same time; and
B is alkyl having 1 to 20 carbon atoms.

Advantageous Effects

The anionic polymerization initiator and the anionic polymerization initiator composition according to the present invention allow styrene blocks to be more effectively polymerized when producing a polyolefin-polystyrene block copolymer.

MODE FOR CARRYING OUT THE INVENTION

Figure 1:
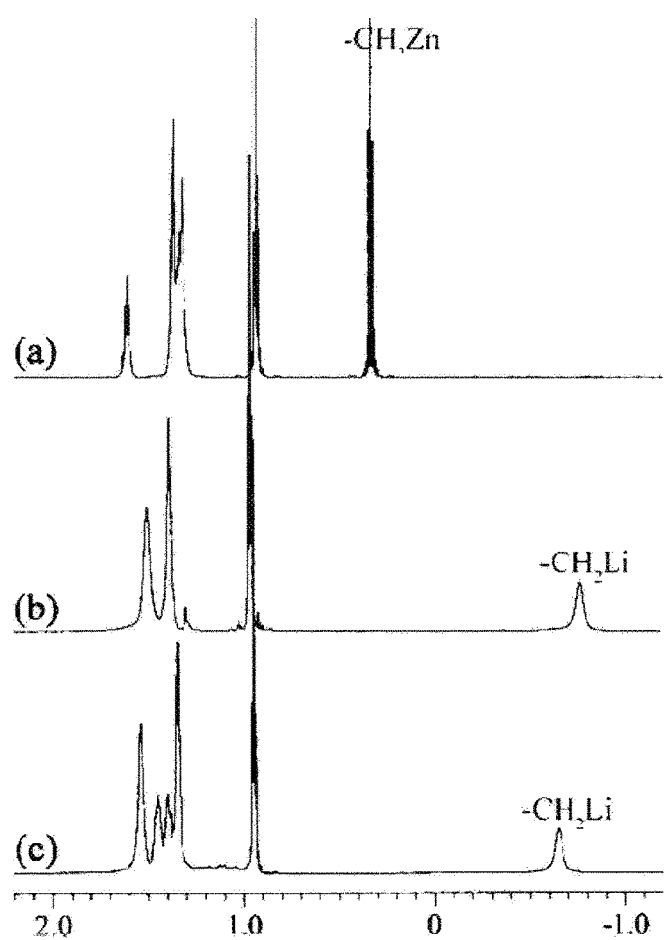
FIG. 1 shows the ¹H NMR spectra of (a) (1-octyl)₂Zn, (b) 1-hexyl lithium, and (c) (1-octyl)Li converted from (1-octyl)₂Zn.

Hereinafter, the present invention will be described in more detail to allow for a clearer understanding of the present invention.

Terms or words used in the present specification and claims shall not be interpreted as being limited to meanings commonly used or meanings defined in dictionaries, and the terms or words should be interpreted as meanings and concepts consistent with the technical idea of the present invention, based on the principle that an inventor can properly define the concept of the terms to best explain the invention.

The term "alkyl" used in the present specification refers to a linear, branched, or cyclic hydrocarbon residue, unless otherwise noted.

The term "cycloalkyl" used in the present specification refers to a non-aromatic cyclic hydrocarbon radical composed of carbon atoms, unless otherwise noted. Non-limiting examples of the "cycloalkyl" include cyclopropyl, cyclobutyl, cyclopentyl, cyclohexyl, and cycloheptyl.

The term "aryl" used in the present specification refers to an optionally substituted benzene ring, or a ring system that can be formed by fusing one or more optional substituents, unless otherwise noted. Exemplary optional substituents include substituted $C_{1-3}$ alkyl, substituted $C_{2-3}$ alkenyl, substituted $C_{2-3}$ alkynyl, heteroaryl, heterocyclic aryl, alkoxy optionally having 1 to 3 fluorine substituents, aryloxy, aralkoxy, acyl, aroyl, heteroaroyl, acyloxy, aroyloxy, heteroaroyloxy, sulfanyl, sulfinyl, sulfonyl, aminosulfonyl, sulfonylamino, carboxyamide, aminocarbonyl, carboxy, oxo, hydroxy, mercapto, amino, nitro, cyano, halogen, or ureido. Such rings or ring systems may optionally be fused to an aryl ring (for example, a benzene ring) optionally having one or more substituents, a carbocyclic ring, or a heterocyclic ring. Examples of an "aryl" group include, but are not limited to, phenyl, naphthyl, tetrahydronaphthyl, biphenyl, indanyl, anthracyl, or phenanthryl, and substituted derivatives thereof.

The term "alkenyl" used in the present specification refers to a linear or branched hydrocarbon radical having one or more carbon-carbon double bonds. Examples of the "alkenyl" used herein include, but are not limited to, ethenyl and propenyl.

In the present specification, the term "polymer" refers to a polymer compound produced by polymerization of the same or different types of monomers. The generic term "polymer" includes a "homopolymer", a "copolymer", and a "terpolymer" as well as an "interpolymer".

In the present specification, the term "block" refers to a part of a polymer molecule, which consists of a plurality of constituent units and is different from other parts adjacent to the part in terms of a chemical structure or three-dimensional arrangement, a "block polymer" refers to a polymer formed by connecting a plurality of blocks, and a "block copolymer" refers to a block polymer including two or more kinds of monomers.

The present invention provides an anionic polymerization initiator represented by Formula 1 below.

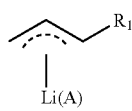

[Formula 1]

In Formula 1,
$R_1$ is hydrogen or a hydrocarbon group having 1 to 20 carbon atoms, and
A is a compound represented by Formula 2 below,

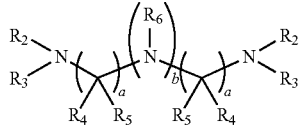

[Formula 2]

in Formula 2,
$R_2$ to $R_6$ are each independently a hydrocarbon group having 1 to 20 carbon atoms, and
a and b are each independently an integer of 0 to 3, and a and b are not 0 at the same time.

In an aspect of the present invention, $R_1$ may be hydrogen, alkyl having 1 to 20 carbon atoms, cycloalkyl having 3 to 20 carbon atoms, or substituted or unsubstituted arylalkyl having 7 to 20 carbon atoms;
$R_2$ to $R_6$ may be each independently alkyl having 1 to carbon atoms, alkenyl having 1 to 20 carbon atoms, cycloalkyl having 3 to 20 carbon atoms, substituted or unsubstituted aryl having 6 to 20 carbon atoms, or substituted or unsubstituted arylalkyl having 7 to 20 carbon atoms; and
a and b may be each independently an integer of 0 to 2.

Moreover, in the aspect of the present invention, $R_1$ to $R_6$ may be each independently hydrogen or alkyl having 1 to 20 carbon atoms; and a may be 1 or 2 and b may be 0 or 1.

Specifically, a may be an integer of 1 to 3 and b may be an integer of 0 to 3, more specifically, a may be 1 or 2 and b may be an integer of 0 to 2, and even more specifically, a may be 1 or 2 and b may be 0 or 1.

In the aspect of the present invention, A in Formula 1 may be specifically represented by Formula 3 or 4 below.

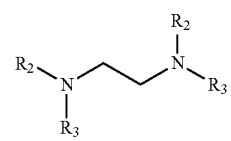

[Formula 3]

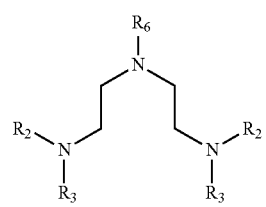

[Formula 4]

In the formulae,
$R_2$, $R_3$, and $R_6$ are each independently hydrogen or alkyl having 1 to 20 carbon atoms.

Moreover, in the aspect of the present invention, A in Formula 1 may be specifically represented by Formula 3a or 4a below.

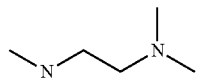

[Formula 3a]

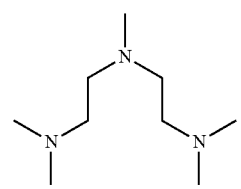

[Formula 4a]

The anionic polymerization initiator according to the aspect of the present invention is an anionic polymerization initiator for polymerizing a polystyrene block of a polyolefin-polystyrene block copolymer, and may be used as an anionic polymerization initiator for forming a polyolefin-polystyrene block copolymer by being reacted with a polyolefin zinc compound such as (polyolefinyl)$_2$Zn.

The (polyolefinyl)$_2$Zn is produced through coordinative chain transfer polymerization (CCTP), and the further growth of a polymer chain initiated from the (polyolefinyl)$_2$Zn can be usefully used in the synthesis of a polyolefin (PO)-based block copolymer. For example, the synthesis of polyethylene-block-polyester or polyethylene-block-polyether was attempted using PO functionalized with an —OH terminal group, and the copolymer could be generated by treating (polyolefinyl)$_2$Zn, which is a CCTP product, with $O_2$. Similarly, a polyethylene-block-polystyrene block copolymer can be produced by enabling the synthesis of a polystyrene (PS) block from (polyolefinyl)$_2$Zn through a one-pot process, and a PS chain can be efficiently grown from (polyolefinyl)$_2$Zn by polymerizing a styrene monomer in the presence of (polyolefinyl)$_2$Zn using the anionic polymerization initiator according to the present invention.

Furthermore, the present invention provides an anionic polymerization initiator composition containing a compound represented by Formula 2 below and a compound represented by Formula 5 below.

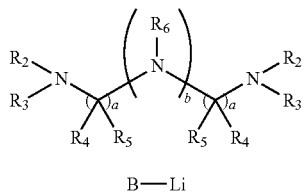
[Formula 2]

B—Li   [Formula 5]

In Formula 2,

R$_2$ to R$_6$ are each independently hydrogen or a hydrocarbon group having 1 to 20 carbon atoms, and a and b are each independently an integer of 0 to 3, and a and b are not 0 at the same time; and in Formula 5, B is alkyl having 1 to 20 carbon atoms.

In an aspect of the present invention, R$_2$ to R$_6$ may be each independently hydrogen, alkyl having 1 to 20 carbon atoms, alkenyl having 1 to 20 carbon atoms, cycloalkyl having 3 to 20 carbon atoms, substituted or unsubstituted aryl having 6 to 20 carbon atoms, or substituted or unsubstituted arylalkyl having 7 to 20 carbon atoms;

B may be alkyl having 1 to 12 carbon atoms; and a and b may be each independently an integer of 0 to 2.

Moreover, in the aspect of the present invention, R$_2$ to R$_6$ may be each independently hydrogen or alkyl having 1 to 20 carbon atoms; B may be alkyl having 1 to 8 carbon atoms; and a may be an integer of 1 or 2 and b may be an integer of 0 or 1.

Specifically, a may be an integer of 1 to 3 and b may be an integer of 0 to 3, more specifically, a may be 1 or 2 and b may be an integer of 0 to 2, and even more specifically, a may be 1 or 2 and b may be 0 or 1.

In the aspect of the present invention, the anionic polymerization initiator composition further contains a compound represented by Formula 6 below.

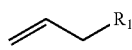
[Formula 6]

R$_1$ is hydrogen or a hydrocarbon group having 1 to 20 carbon atoms, and may be as defined in Formula 1.

The anionic polymerization initiator composition may or may not further contains, in addition to the compound represented by Formula 2, the compound represented by Formula 5, and the compound represented by Formula 6, another compound, which can serve as a solvent, in a trace amount that does not significantly cause a reaction with the compound represented by Formula 5.

Moreover, in the aspect of the present invention, the compound represented by Formula 2 may be a compound represented by Formula 3 or 4 below.

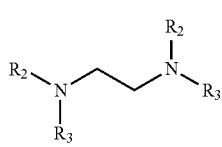
[Formula 3]

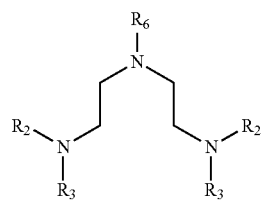
[Formula 4]

In the formulae,

R$_2$, R$_3$, and R$_6$ are each independently hydrogen or alkyl having 1 to 20 carbon atoms.

When the anionic polymerization initiator composition containing the compound represented by Formula 2 and the compound represented by Formula 5 is added as an anionic polymerization initiator, the same structure as Formula 1 can be formed, and thus the anionic polymerization initiator composition can serve as an anionic polymerization initiator.

In addition, the present invention provides a method for producing the anionic polymerization initiator.

The method for producing the anionic polymerization initiator according to an aspect of the present invention includes a process of adding a compound represented by Formula 5 below and a compound represented by Formula 2 below in the presence of a compound represented by Formula 6 below, and performing a reaction.

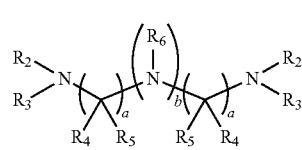
[Formula 2]

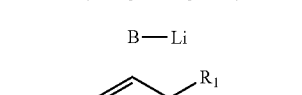
B—Li   [Formula 5]

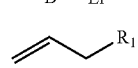
[Formula 6]

In the formulae,

R$_1$ to R$_6$ are each independently hydrogen or a hydrocarbon group having 1 to 20 carbon atoms;

a and b are each independently an integer of 0 to 3, and a and b are not 0 at the same time; and B is alkyl having 1 to 20 carbon atoms.

In the aspect of the present invention, R$_2$ to R$_6$ may be each independently hydrogen, alkyl having 1 to 20 carbon atoms, alkenyl having 1 to 20 carbon atoms, cycloalkyl having 3 to 20 carbon atoms, substituted or unsubstituted aryl having 6 to 20 carbon atoms, or substituted or unsubstituted arylalkyl having 7 to 20 carbon atoms; a and b may be each independently an integer of 0 to 2; and B may be alkyl having 1 to 12 carbon atoms.

Moreover, in the aspect of the present invention, R$_2$ to R$_6$ may be each independently hydrogen or alkyl having 1 to 20 carbon atoms; a may be an integer of 1 or 2 and b may be an integer of 0 or 1; and B may be alkyl having 1 to 8 carbon atoms.

Specifically, a may be an integer of 1 to 3 and b may be an integer of 0 to 3, more specifically, a may be 1 or 2 and b may be an integer of 0 to 2, and even more specifically, a may be 1 or 2 and b may be 0 or 1.

The alkyl lithium compound represented by Formula 5 may be, for example, n-BuLi, and the n-BuLi is a material widely used as an anionic polymerization initiator, is easily available, and has excellent unit cost efficiency.

In the method for producing the anionic polymerization initiator according to the aspect of the present invention, a process of reacting the compound represented by Formula 5 with the compound represented by Formula 6 may be preferentially performed, and then the compound represented by Formula 2 may be reacted with the resultant to form the compound represented by Formula 1. Specifically, the compound represented by Formula 5 is reacted with the compound represented by Formula 6 to generate alkyl lithium as an intermediate, and the alkyl lithium is reacted with the compound represented by Formula 2 to finally form an anionic polymerization initiator represented by Formula 1.

Moreover, in the method for producing the anionic polymerization initiator according to the aspect of the present invention, the process of adding the compound represented by Formula 5 and the compound represented by Formula 2 in the presence of the compound represented by Formula 6, and performing a reaction may be performed under a condition where an additional solvent is absent. The condition where an additional solvent is absent means that another compound, which can serve as a solvent, in addition to the compound represented by Formula 5 and the compound represented by Formula 2 in the presence of the compound represented by Formula 6, is not present, or is present in a trace amount that does not significantly cause a reaction with the compound represented by Formula 5.

When the aforementioned reaction is performed under the condition where an additional solvent is absent, the reaction between the compound represented by Formula 6 and the compound represented by Formula 5 is a main reaction, so that the anionic polymerization initiator represented by Formula 1 can be effectively produced. When an additional solvent is present, the anionic polymerization initiator represented by Formula 1, the compound generated by reacting the compound represented by Formula 5 with the compound represented by Formula 2, and the compound obtained by decomposing the compound generated by reacting the compound represented by Formula 5 with the compound represented by Formula 2 are present in a mixed manner, which is not effective.

The anionic polymerization initiator or anionic polymerization initiator compound according to the present invention can be usefully used as an initiator for polymerizing styrene, and can be effectively used as an initiator for growing a polystyrene chain from polyolefin of the organozinc compound, in particular, (polyolefinyl)$_2$Zn in which a polyolefin chain is grown on the basis of zinc (Zn).

Therefore, the present invention also provides a method for producing a polyolefin-polystyrene block copolymer, the method including a step of polymerizing styrene in the presence of the anionic polymerization initiator or the anionic polymerization initiator composition.

The polyolefin may be a homopolymer of an olefin-based monomer or a copolymer of two or more kinds thereof, and specifically, may be a copolymer of ethylene and one or more kinds of α-olefin-based monomers. Examples of the olefin-based monomer include ethylene, α-olefin, and cyclic olefin, and examples of the α-olefin include propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-itocene, 4,4-dimethyl-1-pentene, 4,4-diethyl-1-hexene, and 3,4-dimethyl-1-hexene.

The polystyrene may be a homopolymer of a styrene-based monomer or a copolymer of two or more kinds thereof. Examples of the styrene-based monomer include styrene, α-methyl styrene, vinyl toluene, alkyl styrene (for example, o-methyl styrene, m-methyl styrene, p-methyl styrene, p-ethyl styrene, or the like) substituted with a $C_{1-3}$ alkyl group, and styrene substituted with halogen, and specifically, the styrene-based monomer may be styrene.

EXAMPLES

Hereinafter, the present invention will be described in more detail with reference to Examples. However, the following Examples are for illustratively describing the present invention, and the scope of the present invention is not limited to these Examples.

<Reagents and Experimental Conditions>

All operations were performed under an inert atmosphere using a standard glove box and a Schlenk technology. Methylcyclohexane was purchased from Sigma-Aldrich, Inc., and purified with a Na/K alloy.

Ethylene/propylene mixed gas was purified with trioctylaluminum (13.6 M in methylcyclohexane) in a bomb reactor (2.0 L).

$^1$H NMR (600 MHz) and $^{13}$C NMR (150 MHz) spectra were recorded using an ECZ 600 apparatus (JEOL Ltd.).

Gel permeation chromatography (GPC) data were obtained in 1,2,4-trichlorobenzene at 160° C. using a PL-GPC 220 system equipped with an IR detector and two columns [PLarian mixed-B 7.5×300 mm Varian (Polymer Lab)].

(1-Octyl)$_2$Zn and (1-hexyl)$_2$Zn were produced and purified as described in the document [Kim S. D. et al. Peroxide-Mediated Alkyl-Alkyl Coupling of Dialkylzinc: A Useful tool for Synthesis of ABA-Type Olefin Triblock Copolymers. Macromolecules 2018, 51, 4821 to 4828]. After removing a solvent in the glove box, and n-BuLi and sec-BuLi were used as pure oil and t-BuLi was used as a solid.

Reference Example 1

(i) Conversion of (1-Octyl)$_2$Zn into (1-Octyl)Li (1-Octyl)$_2$Zn (53.4 mg, 0.200 mmol) was added to a solution of t-BuLi (25.6 mg, 0.400 mmol) in methylcyclohexane (27.0 g). The mixture was stirred for 15 minutes at room temperature, and then volatile matter was removed using a vacuum line. Light-yellow oil was obtained, the $^1$H and $^{13}$C NMR spectra thereof were checked, and it was confirmed that these spectra were agreed with those of 1-octyl lithium (yield of 91%).

$^1$H NMR ($C_6D_6$): δ 1.54 (s, 2H, $CH_2$), 1.49-1.33 (br, 10H, $CH_2$), 0.94 (t, J=7.2 Hz, 3H, $CH_3$), 3.33 (s, 2H, $LiCH_2$) ppm.

$^{13}$C NMR ($C_6D_6$): δ 38.79, 32.50, 32.23, 29.94, 29.79, 29.68, 23.20, 14.43 ppm.

Reference Example 2

(i) Conversion of (1-Octyl)$_2$Zn into (1-Octyl)Li (1-Octyl)$_2$Zn (0.29 g, 1.0 mmol) was added to a solution of t-BuLi (0.13 g, 2.0 mmol) in decane (10 g). The solution was stirred for 20 minutes at 130° C. while discharging the generated gas. A black solid was generated, and filtered through celite. Decane was distilled at 50° C. under full vacuum to obtain light-yellow oil of which the $^1$H and $^{13}$C NMR spectra were agreed with those of 1-octyl lithium (0.22 g, 91%).

$^1$H NMR (C$_6$D$_6$): δ 1.54 (s, 2H, CH$_2$), 1.49-1.33 (br, 10H, CH$_2$), 0.94 (t, J=7.2 Hz, 3H, CH$_3$), 3.33 (s, 2H, LiCH$_2$) ppm.

$^{13}$C NMR (C$_6$D$_6$): δ 38.79, 32.50, 32.23, 29.94, 29.79, 29.68, 23.20, 14.43 ppm.

Reference Example 3

(2-Ethylhexyl)$_2$Zn was converted into 2-ethylhexyl lithium at a yield of 84% using the same method as in Reference Example 1.

Reference Example 4

(2-Ethylhexyl)$_2$Zn was converted into 2-ethylhexyl lithium at a yield of 84% using the same method as in Reference Example 2.

The alkyl lithium compound is a material widely used as an anionic polymerization initiator commonly used in living anionic polymerization, and can be converted into alkyl lithium by being reacted with a dialkylzinc compound. The alkyl lithium converted as described above has higher reactivity than the corresponding dialkylzinc compound.

In general, a reaction for converting the alkyl lithium compound into the dialkylzinc compound has been performed, but a reverse reaction thereof, that is, converting the dialkylzinc compound into the alkyl lithium compound is not preferable and has not yet been realized. However, the inventors of the present invention could convert the dialkylzinc compound into the alkyl lithium by adding alkyl lithium having extremely high reactivity and containing bulky tertiary alkyl to the dialkylzinc compound to generate a compound, in which alkyl of the dialkylzinc compound and alkyl of the alkyl lithium are temporarily converted into each other, and then selectively removing the generated dialkylzinc compound containing tertiary alkyl from the reaction system through evacuation (Reference Example 1) or decomposition at a high temperature (Reference Example 2).

Figure 2:
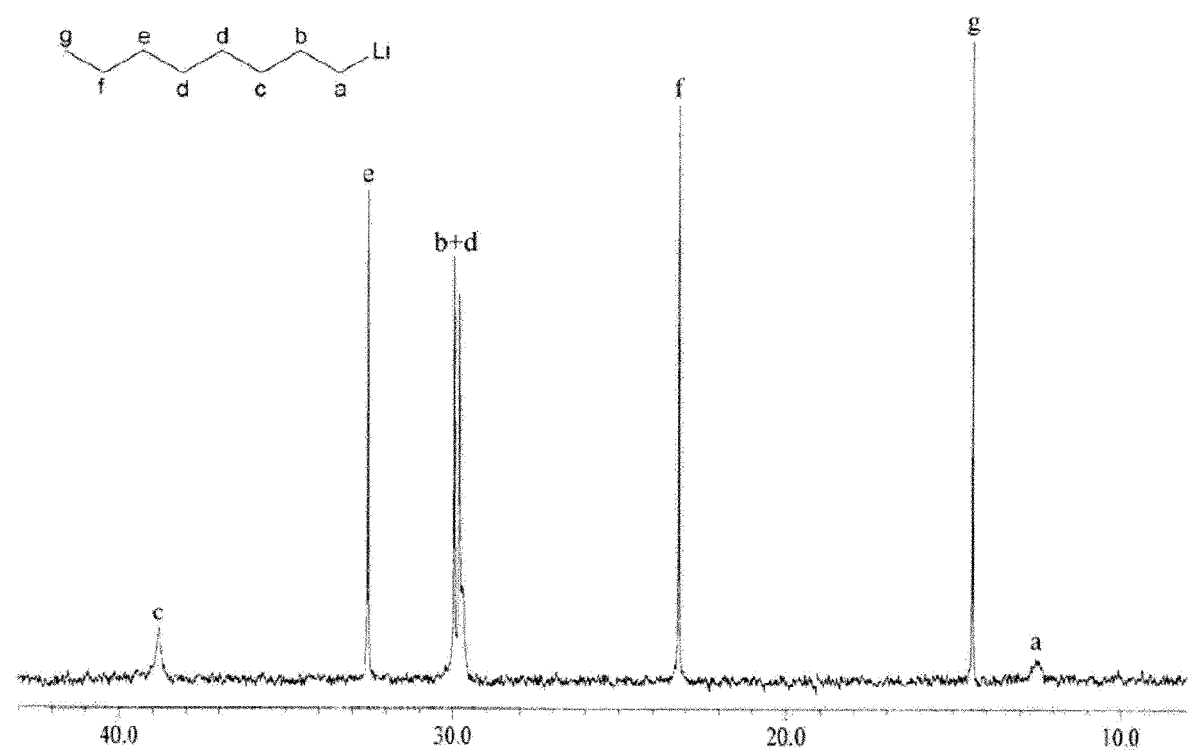
FIG. 2 shows the ¹³C NMR spectrum of (1-octyl)Li converted from (1-octyl)₂Zn in C₆D₆.

The $^1$H NMR spectra of (1-octyl)$_2$Zn (a), 1-hexyl lithium (b), and (1-octyl)Li converted from (1-octyl)$_2$Zn (c) are shown in FIG. 1, and the $^{13}$C NMR spectrum of (1-octyl)Li converted from (1-octyl)$_2$Zn is shown in FIG. 2.

For example, as shown in Reaction Formula 1 below, 1-octyl lithium and (t-Bu)$_2$Zn could be temporarily generated by adding bulky t-BuLi (2.0 eq) having extremely high reactivity to (1-octyl)$_2$Zn, and 1-octyl lithium could be produced by selectively removing the generated (t-Bu)$_2$Zn from the reaction system through evacuation at a high temperature or selective decomposition at a high temperature. However, when n-BuLi, sec-BuLi, or Me$_3$SiCH$_2$Li were used instead of t-BuLi, not 1-octyl lithium but only a mixture of alkyl lithium and (1-octyl)$_2$Zn remained after evacuation.

[Reaction Formula 1]

(a)

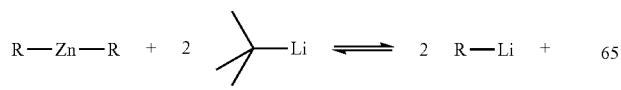

-continued

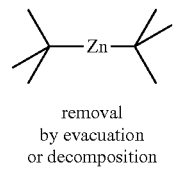

removal by evacuation or decomposition (b)

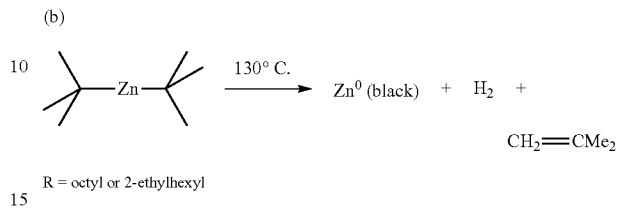

R = octyl or 2-ethylhexyl

The dialkylzinc compound containing tertiary alkyl could be removed through selective decomposition at a high temperature of 130° C. (Reference Example 2). A (primary alkyl)$_2$Zn compound is stable up to 150° C. and can be used as a chain transfer agent (CTA) in coordinative chain transfer polymerization (CCTP) at 125° C. to 145° C., but it could be confirmed that the (t-Bu)$_2$Zn was decomposed at 130° C. and a black solid was precipitated when a solution of (t-Bu)$_2$Zn in decane was heated at 130° C.

Isobutene and H$_2$ signals were detected in the $^1$H NMR spectrum when the reaction was performed in a sealed tube in toluene-d$_8$ (see (b) in Reaction Formula 1). The (primary alkyl) lithium such as n-BuLi in decane was negligibly decomposed at 130° C. (half-life, 6 hours). Meanwhile, t-BuLi was persistent at 130° C. for a short time of 30 minutes. Accordingly, when a solution of (1-octyl)$_2$Zn and t-BuLi (2.0 equivalents) in decane was heated at 130° C. for about 30 minutes, a black solid was precipitated. This indicates the decomposition of (t-Bu)$_2$Zn.

The 1-octyl lithium was cleanly separated from a reaction pot by filtration, and obtained at a yield of 91%.

When benzaldehyde was added after the heat treatment, PhCH(OH)(CH$_2$)$_7$CH$_3$ was obtained. Since (1-octyl)$_2$Zn is not reacted with benzaldehyde, the successful generation of 1-octyl lithium could be further confirmed.

Figure 3:
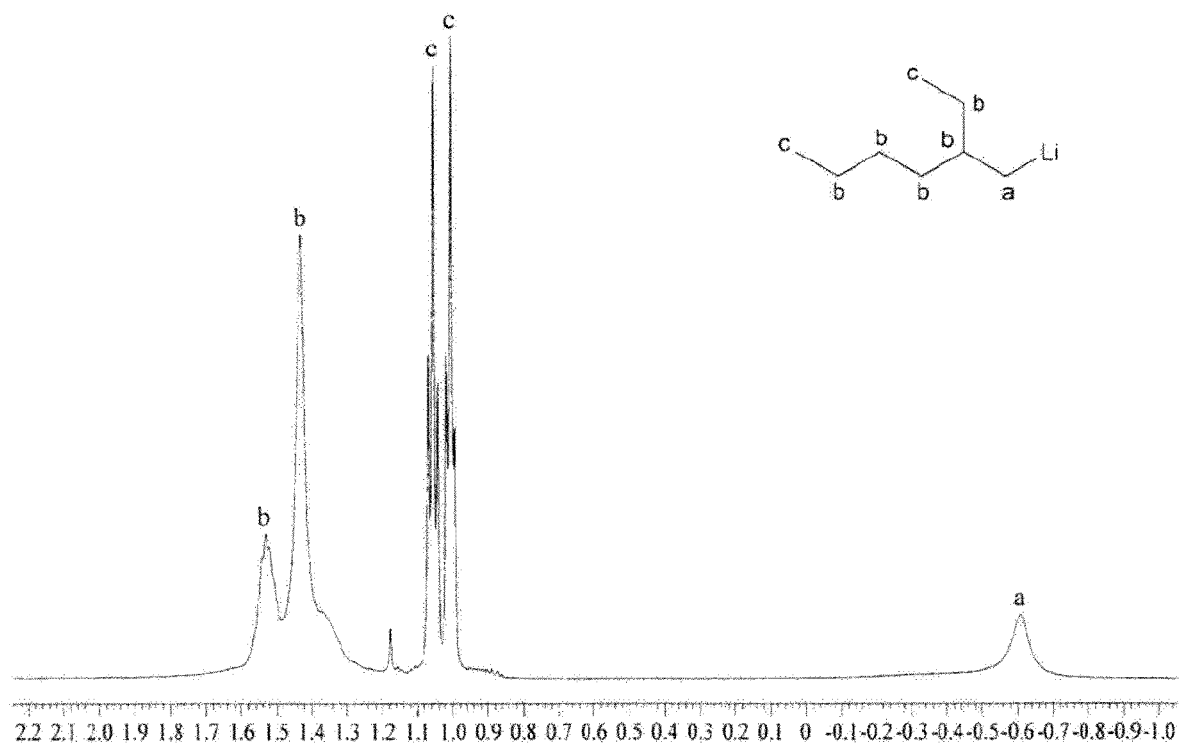
FIG. 3 shows the ¹H NMR spectrum of 2-ethylhexyl lithium converted from (1-ethylhexyl)₂Zn in C₆D₆.
Figure 4:
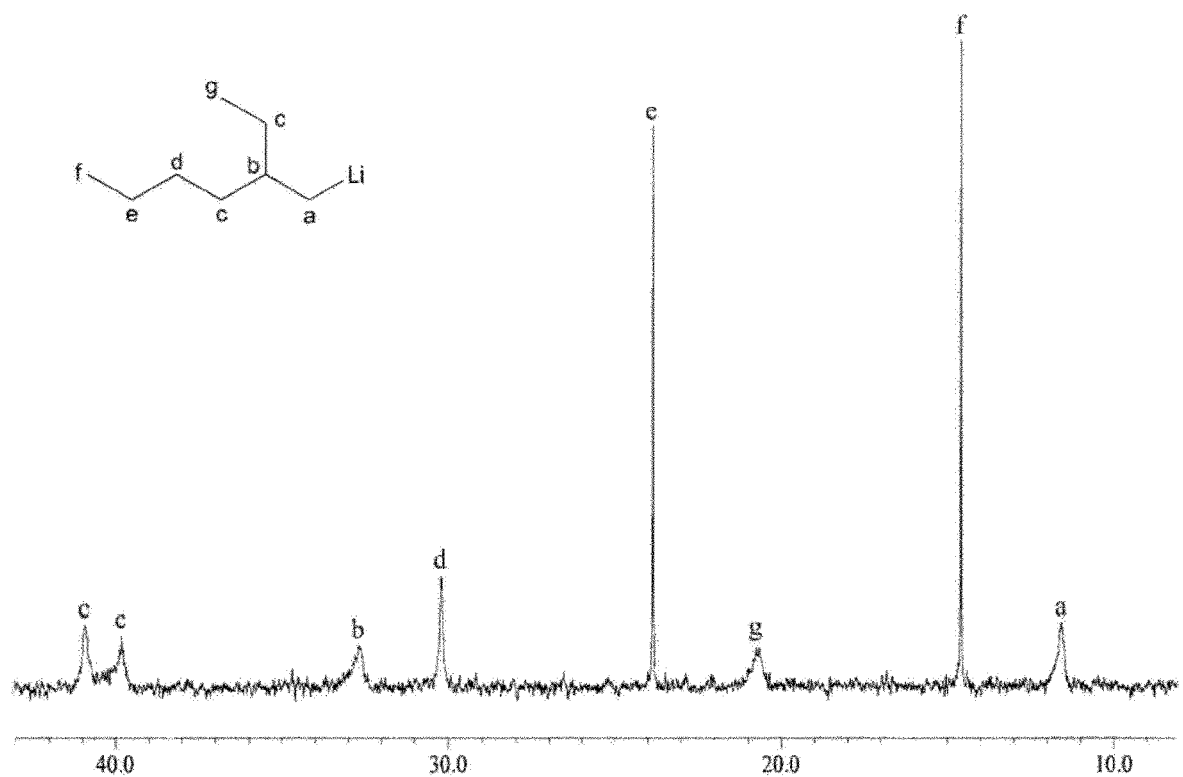
FIG. 4 shows the ¹³C NMR spectrum of 2-ethylhexyl lithium converted from (1-ethylhexyl)₂Zn in C₆D₆.

(2-Ethylhexyl)$_2$Zn was converted into 2-ethylhexyl lithium at a yield of 84% using the same method as described above (Reference Examples 3 and 4), and the $^1$H NMR spectrum of the 2-ethylhexyl lithium is shown in FIG. 3 and the $^{13}$C NMR spectrum thereof is shown in FIG. 4.

Experiments for Reference Examples (1) Production of (Polyolefinyl)$_2$Zn (Polyolefinyl)$_2$Zn was produced through coordinative chain transfer copolymerization, (CCTcoP), which was performed using a pyridylamidohafnium catalyst at a high temperature of 90° C. to 110° C. by supplying ethylene/propylene mixed gas. The process is as shown in Reaction Formula 2 below.

[Reaction Formula 2]

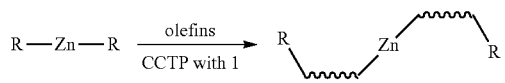

(1-Hexyl)₂Zn (100 or 200 μmol-Al) and the minimum amount of MMAO (50 μmol-Al) were supplied as a chain transfer agent (CTA).

Specifically, methylcyclohexane (26 g), a catalyst (2.0 μmol) containing a transition metal compound represented by Formula 7 below and $[(C_{18}H_{37})N(Me)H^+[B(C_6F_5)_4]^-$ as a co-catalyst, and modified methylaluminoxane (MMAO) were used as a scavenger (50 μmol-Al) for the coordinative chain transfer polymerization (CCTP).

[Formula 7]

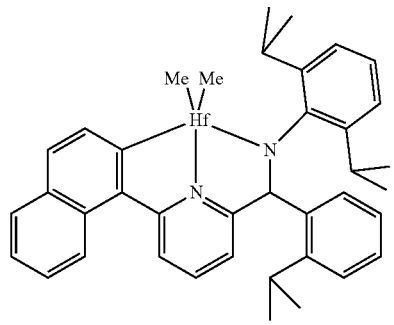

(2) Production of PO-Block-PS from (Polyolefinyl)₂Zn

Reference Experimental Example 1

The (polyolefinyl)₂Zn generated in the section (1) above was treated with t-BuLi ([Li]=2×[Zn]+[Al], that is, 250 or 450 μmol) for 1.0 hour at 130° C. to 135° C., and the temporarily generated (t-Bu)₂Zn was removed to obtain polyolefinyl-Li.

Styrene (5.0 g) in methylcyclohexane (15 g) was supplied to grow a PS chain initiated from the polyolefinyl-Li, and all of the supplied styrene monomers were completely converted into polymers within 4 hours.

Reference Experimental Examples 2 to 5

Polymerization was performed in the same manner as in Reference Experimental Example 1, except that pentamethyldiethylenetriamine (PMDTA) was added together with the styrene monomers and the amount of the styrene was adjusted to 5.0 g and 10 g.

Figure 5:
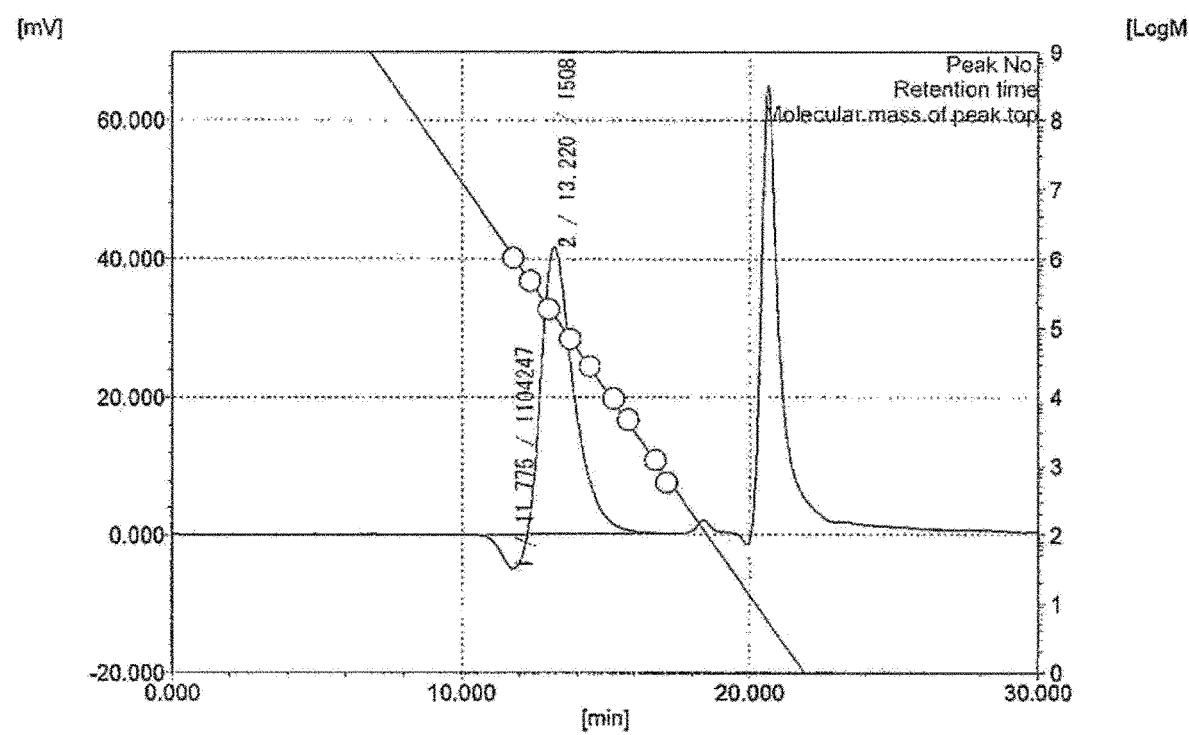
FIG. 5 shows the results of measuring GPC after polymerization according to Reference Experimental Example 1.

As a result of the polymerization according to Reference Experimental Example 1, a desired PO-block-PS was not generated. The GPC results are shown in FIG. 5, and with reference to the results, it can be confirmed that two signals were observed in a direction opposite to a base line. A negative signal (Mn of 1,150,000, Mw/Mn of 1.2) having an extremely high molecular weight and assigned to homo-PS, and a main positive signal (Mn of 61,000, Mw/Mn of 2.3) assigned to PO was not increased compared to the values of the homo-PO sample taken before supplying styrene (Mn of 65,000, Mw/Mn of 2.1). Such results indicate that the obtained polymer was not a block copolymer but a mixture of homo-PO and homo-PS.

Figure 6:
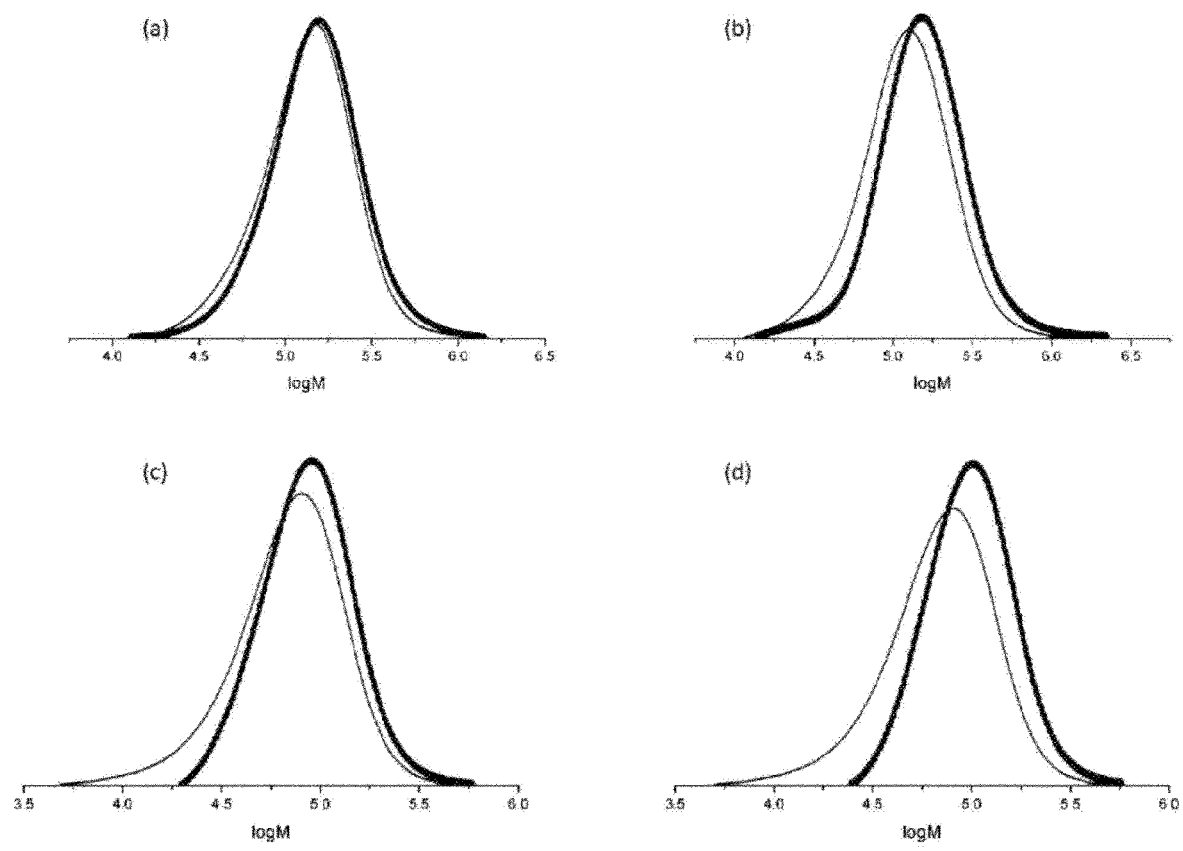
FIG. 6 shows the results of measuring GPC in (a) Reference Experimental Example 2, (b) Reference Experimental Example 3, (c) Reference Experimental Example 4, and (d) Reference Experimental Example 5.

In the cases of Reference Experimental Examples 2 to in which that pentamethyldiethylenetriamine (PMDTA) was added together with the styrene monomers, as shown in FIG. 6 showing the GPC results thereof, the high-molecular-weight homo-PS signal was disappeared, and unimodal curves (thin line) were observed with narrow molecular weight distributions (Mw/Mn of 1.3 to 1.5). Moreover, after the styrene polymerization, the GPC curves (thick line) were shifted to a high-molecular-weight direction with a significant increase in the Mn value (ΔMn of 13 to 41 kDa), which indicates the generation of a desired PO-block-PS.

Meanwhile, it was confirmed that the growth of other polymer chains (for example, polyisoprene and polycaprolactone) initiated from the polyolefinyl-Li also did not occur. After performing the anion polymerization of isoprene, the GPC curves were not shifted to a high-molecular-weight direction, and the increase in the Mn value was negligible.

TABLE 1

|  | (1-Hexyl)₂Zn (μmol) | t-BuLi (μmol) | PO (g); $F_{c3}$ (mol %) | PS (g); Homo fraction (%) | Mn (kDa); PDI before styrene polymerization | Mn (kDa); PDI after styrene polymerization |
| --- | --- | --- | --- | --- | --- | --- |
| Reference Experimental Example 1 | 100 | 250 | 13.1; 23.4 | 5.0; — | 64.6 (2.10) | 61.3 (2.30) |
| Reference Experimental Example 2 | 100 | 250 | 11.4; 20.5 | 5.0; 21 | 108 (1.48) | 121 (1.48) |
| Reference Experimental Example 3 | 100 | 450 | 12.5; 22.6 | 10; 27 | 92 (1.62) | 111 (1.54) |
| Reference Experimental Example 4 | 200 | 450 | 12.9; 22.4 | 5.0; 28 | 51 (1.66) | 75 (1.33) |
| Reference Experimental Example 5 | 200 | 450 | 15.2; 22.8 | 10; 30 | 48 (1.74) | 89 (1.28) |

The number of PS chains in Table 1 was calculated by dividing the weight of the isolated PS by the measured Mn value. The amount of the obtained PS chains was twice the amount (205, 203, and 203 μmol vs. 2×100=200 μmol) of the supplied Zn, and the number of the PS chains was not changed by the amount (50, 70, and 100 μmol) of the supplied lithium species. Such results indicate that the PS chains were selectively grown from all of the supplied (1-hexyl)₂Zn, and the lithium compound was not directly involved as a PS chain-growing site and only served as an activator in the growth process of the PS chains. In Reference Experimental Examples 2 to 5, the styrene monomers were not completely converted into polymers, and thus even considering a long reaction time of 5 hours at a high temperature of 90° C., the yield was 92% to 96%, and the molecular weight distributions were rather wide (Mw/Mn of 1.35 to 1.45).

Production Example of Anionic Polymerization Initiator

Initiator Production Example 1

Production of Pentylallyl-Li·(PMDTA)

n-BuLi (0.14 mg, 2.2 mmol) was added dropwise to PMDTA (0.37 g, 2.2 mmol) in 1-octene (13.0 g). After stirring overnight at room temperature, a yellow solution (0.16 mmol-Li/g) was used for styrene polymerization. An aliquot was analyzed with $^1$H NMR spectroscopy. The $^1$H NMR spectrum was recorded, then the solution of $C_6D_6$ was quenched with $H_2O$ (or $D_2O$) and filtered with a short pad of anhydrous $MgSO_4$ in a pipette, and the $^1$H NMR spectrum was re-record.

Comparative Initiator Production Example 1

Production of 1-Octene, n-BuLi, and PMDTA in methylcyclohexane n-BuLi (1.10 g, 17.3 mmol) was added dropwise to a solution containing PMDTA (3.00 g, 17.3 mmol) and 1-octene (3.90 g, 34.6 mmol) in methylcyclohexane (77 g). After stirring overnight at room temperature, a yellow solution (2.16 mmol-Li/g) was used for styrene polymerization.

Comparative Initiator Production Example 2

Production of $Me_2NCH_2CH_2N(Me)CH_2CH_2N(Me)CH_2Li$ sec-BuLi (12.8 mg, 0.200 mmol) was added dropwise to a solution of PMDTA (34.6 mg, 0.200 mmol) in methylcyclohexane (1.50 g). After stirring for 30 minutes at room temperature, the solution (0.129 mmol-Li/g) was used for styrene polymerization. Additionally, sec-BuLi (12.8 mg, 0.200 mmol) and PMDTA (34.6 mg, 0.200 mmol) were dissolved in $C_6D_{12}$ (about 0.5 mL), and a $^1$H NMR spectrum was recorded after 30 minutes.

Comparative Initiator Production Example 3

Production of $Me_2NCH_2CH_2N(Me)Li$ n-BuLi (10 mL, 1.65 M, 16.5 mmol) was added dropwise to a solution of $Me_2NCH_2CH_2N(Me)H$ (1.69 g, 16.5 mmol) in hexane (25 mL). After stirring for 5 hours at room temperature, the generated solution was filtered through celite. A solvent was removed using a vacuum line.

Comparative Initiator Production Example 4

Production of $Me_2NCH_2CH_2N(Me)Li·(PMDTA)$

The $Me_2NCH_2CH_2N(Me)Li$ produced in Comparative Initiator Production Example 3 was added to an equivalent amount of PMDTA in methylcyclohexane to obtain a white solid (1.56 g, 33%).

$^1$H NMR ($C_6D_6$): δ 3.21 (br, 2H, $CH_2$), 3.11 (br, 3H, $NLi(CH_3)$), 2.45 (br, 2H, $CH_2$), 1.98 (br, 6H, $N(CH_3)_2$) ppm.

Comparative Initiator Production Example 5

Production of PhLi·(PMDTA)

n-BuLi (12.8 mg, 0.200 mmol) was added dropwise to a solution of PMDTA (34.6 mg, 0.200 mmol) in $C_6D_6$ (0.600 g). After stirring for 30 minutes at room temperature, the solution (0.31 mmol-Li/g) was analyzed with $^1$H NMR spectroscopy and used for styrene polymerization.

Comparative Initiator Production Example 6

Production of n-BuLi·(PMDTA)

n-BuLi·(PMDTA) was obtained as described in the document [De Rosa et al. "Expanding the Origin of Stereocontrol in Propene Polymerization Catalysis." ACS *Catal.* 2016, 6, 3767 to 3770].

Comparative Initiator Production Example 7

Production of $Me_3SiCH_2Li·(PMDTA)$ $Me_3SiCH_2Li·(PMDTA)$ was obtained as described in the document [Park, S. S. et al. "Synthesis of polyolefin-block-polystyrene through sequential coordination and anionic polymerizations." *J. Polym. Sci. Part A: Polym. Chem,* 2016, 54, 3110 to 3118].

Analysis on Initiator

Figure 7:
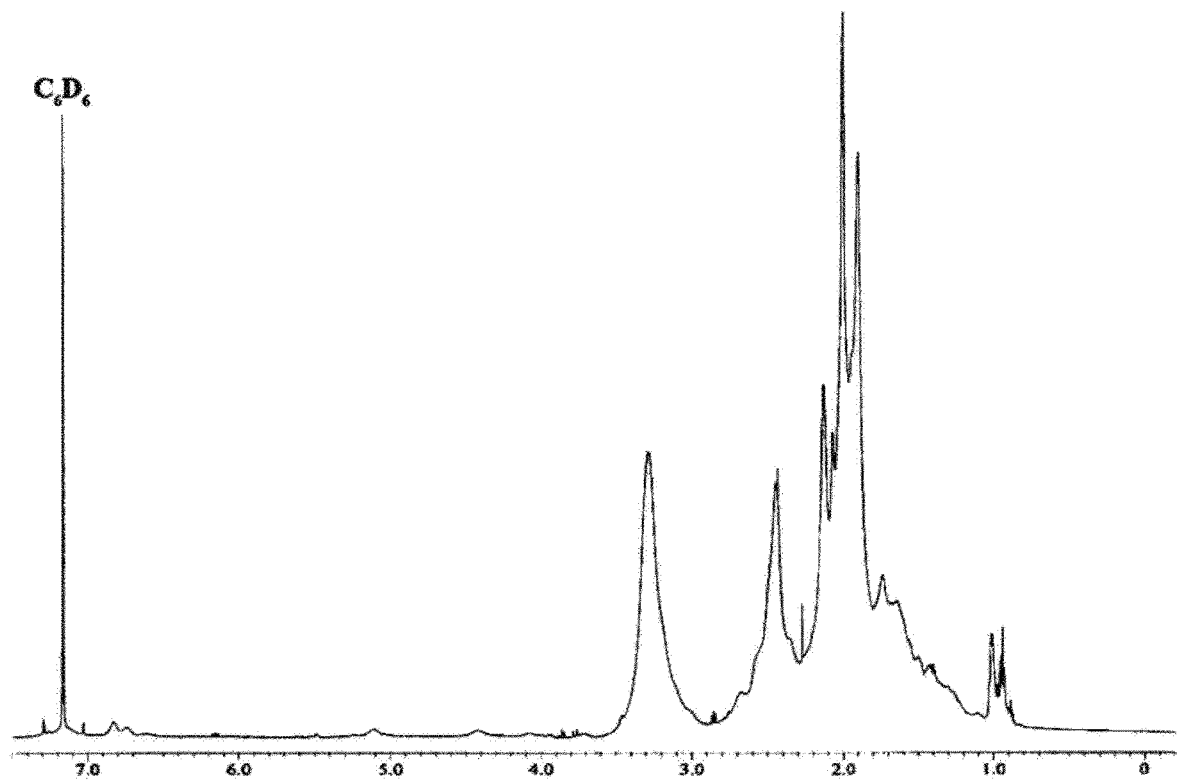
FIG. 7 shows the ¹H NMR spectrum of a compound produced in Comparative Initiator Production Example 1.
Figure 8:
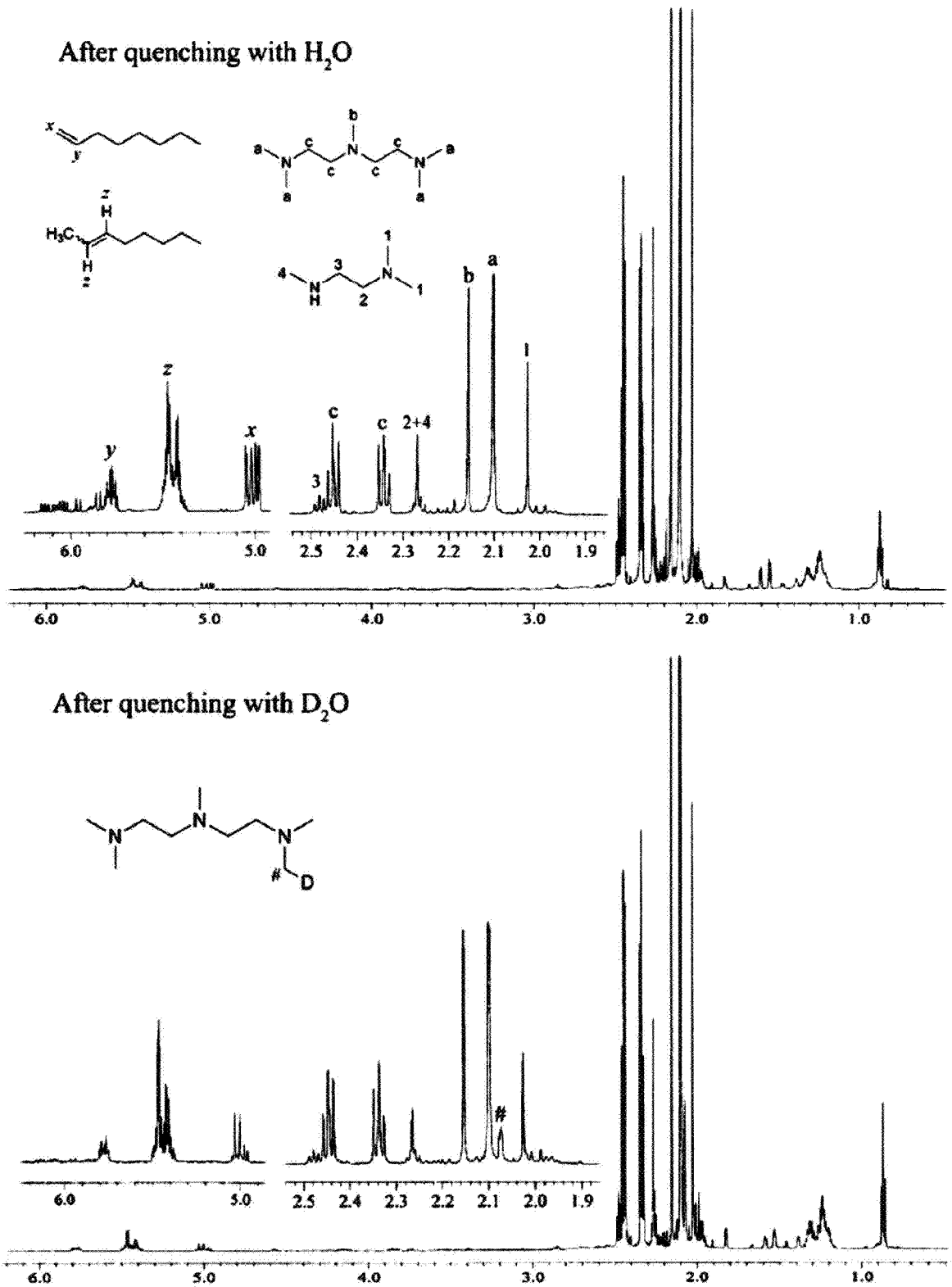
FIG. 8 shows the ¹H NMR spectra of pentylallyl-Li, Me₂NCH₂CH₂N(Me)Li, and Me₂NCH₂CH₂N(Me)CH₂CH₂N(Me)CH₂Li.

As a result of checking the $^1$H NMR spectrum of a material (1-octene+n-BuLi+PMDTA) generated by adding n-BuLi dropwise to a solution containing PMDTA and 1-octene in methylcyclohexane as in Comparative Initiator Production Example 1, as can be seen in FIG. 7, a broad and hardly acceptable signal was observed. This indicates that pentylallyl-Li, $Me_2NCH_2CH_2N(Me)Li$, and $Me_2NCH_2CH_2N(Me)CH_2CH_2N(Me)CH_2Li$ are present in a mixed manner, and the $^1$H NMR spectra thereof are shown in FIG. 8.

Figure 9:
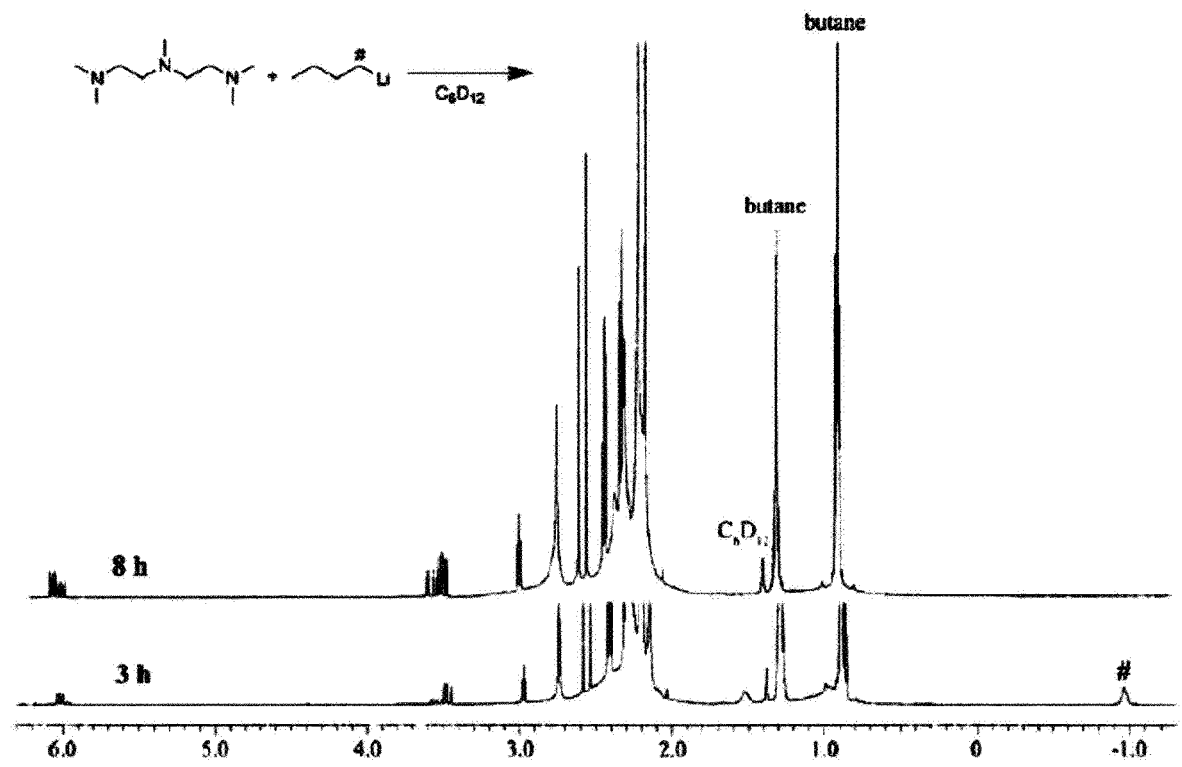
FIG. 9 shows the ¹H NMR spectrum of a reaction product of PMDTA and n-BuLi in C₆D₁₂.
Figure 9:
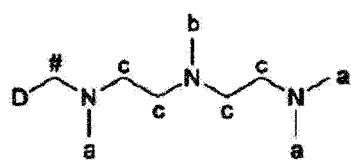
Figure 9:
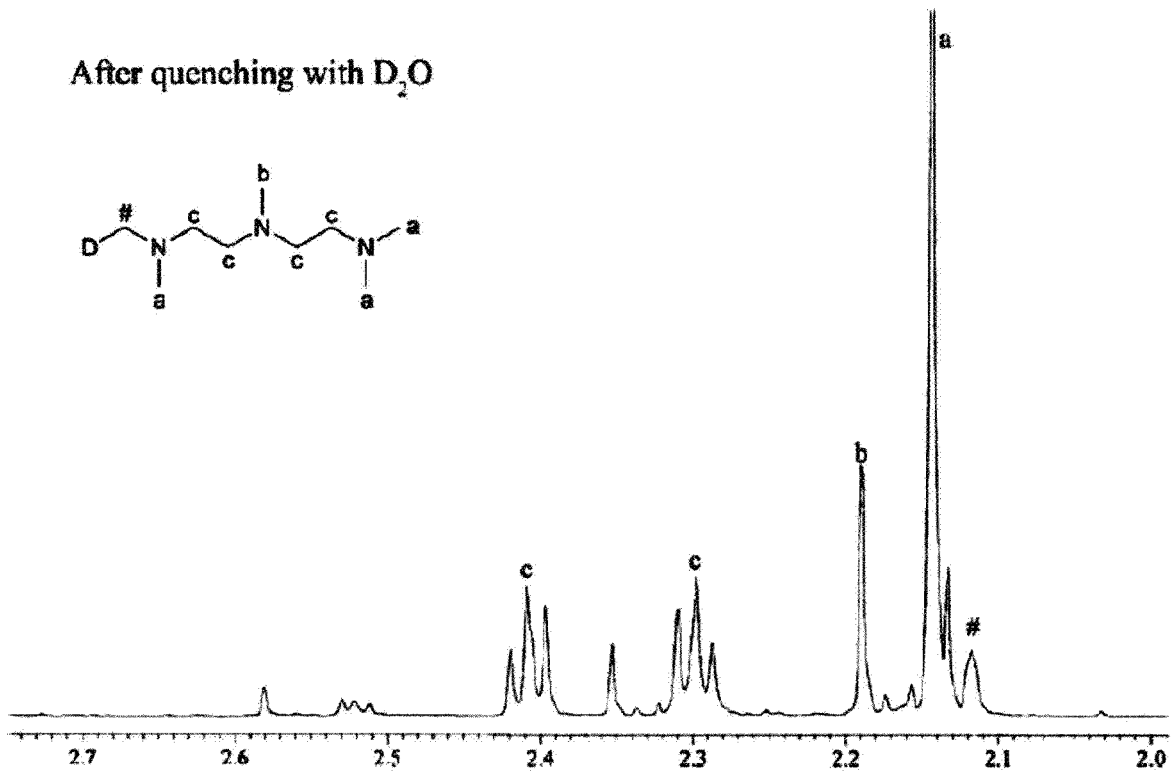
Figure 10:
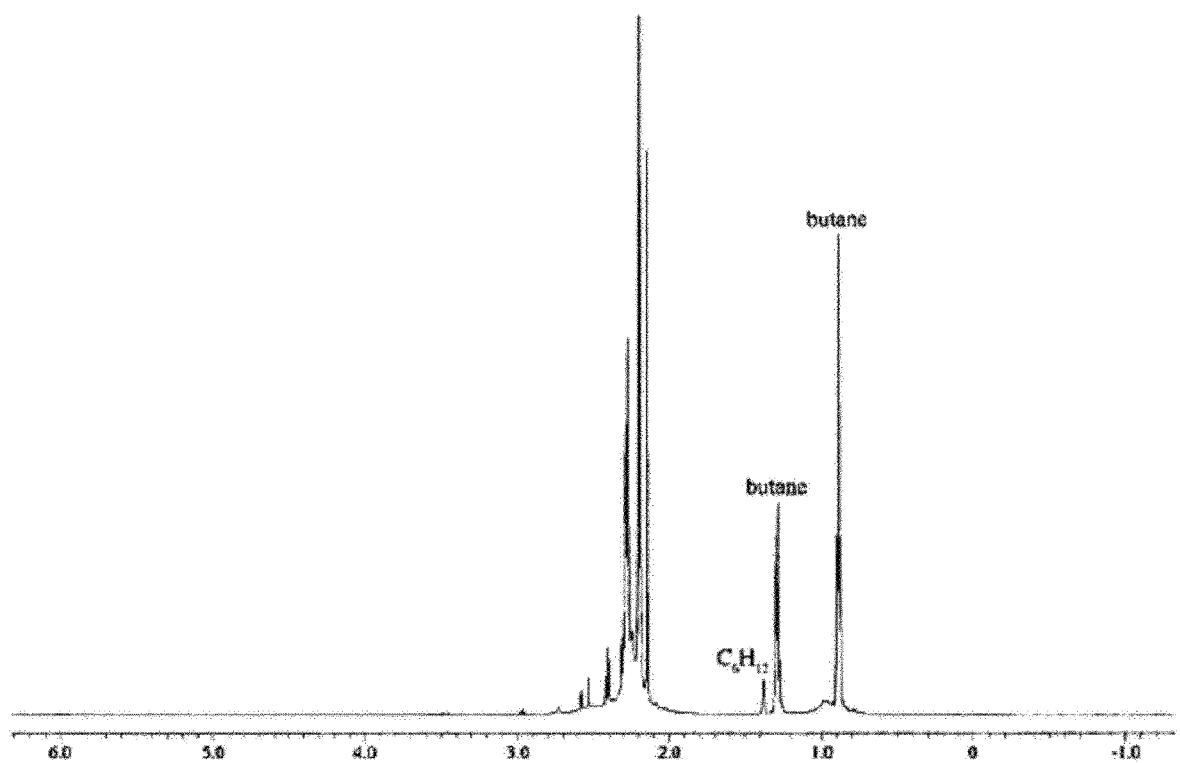
FIG. 10 shows the ¹H NMR spectrum of a reaction product of PMDTA and sec-BuLi in C₆D₁₂.

The reaction of n-BuLi with PMDTA in $C_6D_{12}$ was monitored by $^1$H NMR spectroscopy, and it was confirmed that n-BuLi was slowly reacted with PMDTA and thus it took about 8 hours at room temperature to completely consume n-BuLi and as shown in FIG. 9, mainly $Me_2NCH_2CH_2N(Me)CH_2CH_2N(Me)CH_2Li$ was generated. It could be confirmed that the generated $Me_2NCH_2CH_2N(Me)CH_2CH_2N(Me)CH_2Li$ was unstable and thus converted to $Me_2NCH_2CH_2N(Me)Li$, $Me_2NLi$, and PMDTA, and sec-BuLi was reacted with PMDTA within 30 minutes at room temperature to generate mainly $Me_2NCH_2CH_2N(Me)CH_2CH_2N(Me)CH_2Li$ in $C_6D_{12}$ as shown in FIG. 10.

Figure 11:
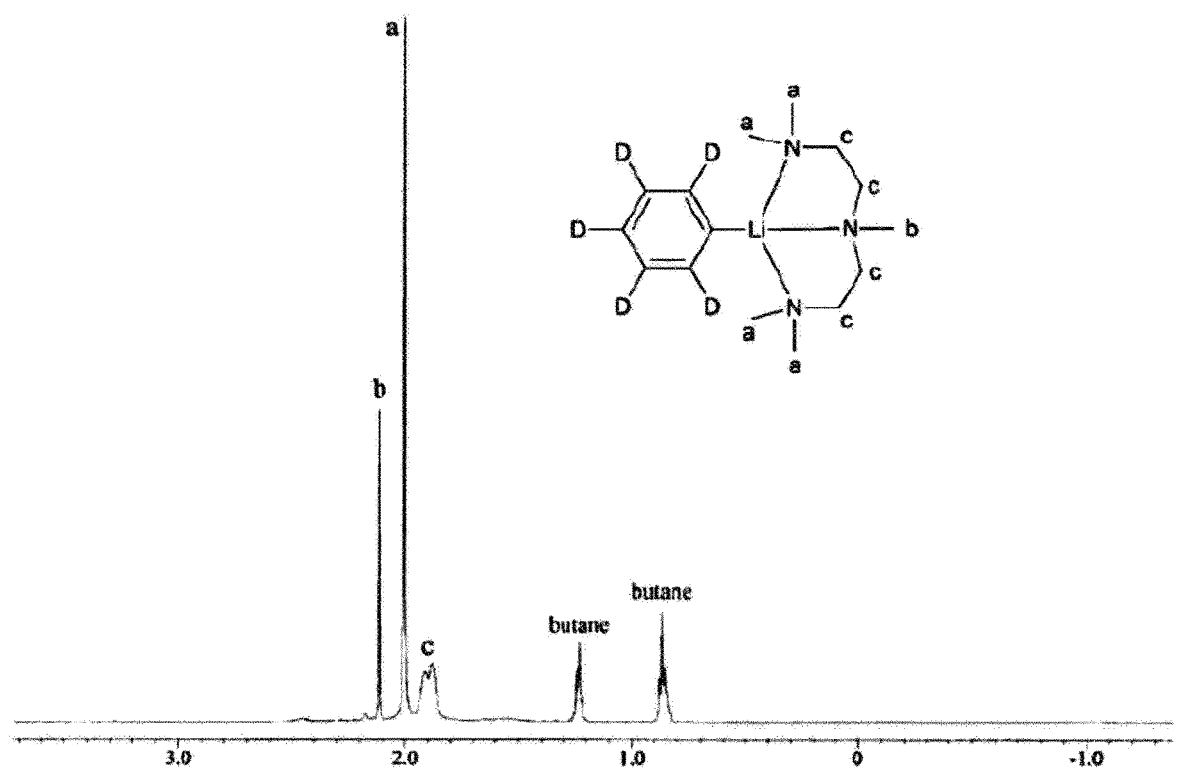
FIG. 11 shows the ¹H NMR spectrum of C₆D₅Li·(PMDTA) obtained from PMDTA treated with n-BuLi in C₆D₆.
Figure 12:
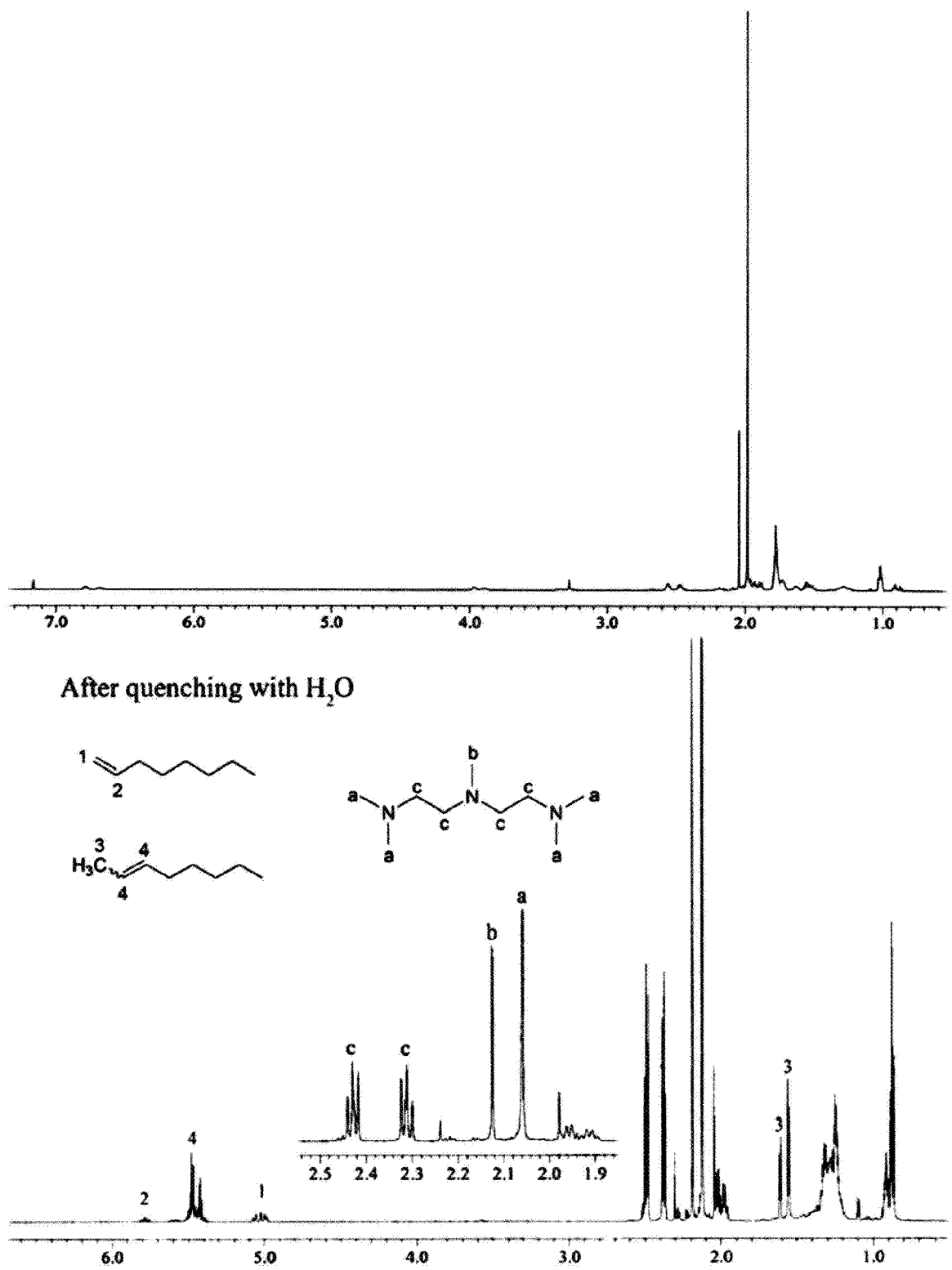
FIG. 12 shows the ¹H NMR spectrum of pentylallyl-Li obtained through a reaction of "PMDTA+n-BuLi" in 1-octene.

$C_6D_5Li·(PMDTA)$ could be cleanly obtained from PMDTA treated with n-BuLi in $C_6D_6$. The $^1$H NMR spectrum is shown in FIG. 11. The color of the solution was gradually turned to yellow in n-BuLi in 1-octene (as a solvent and a reactant). The $^1$H NMR spectrum of a lithium species generated through the reaction of "PMDTA+n-BuLi" in 1-octene was ambiguous. However, the signals assigned to 2-octene (as a mixture of cis- and trans-isomers) and 1-octene were observed after quenching with $H_2O$, indicating the generation of pentylallyl-Li through the reaction of "PMDTA+n-BuLi" in 1-octene. The $^1$H NMR spectrum is shown in FIG. 12.

Polymerization Experimental Example 1—PS Polymerization from (1-Hexyl)$_2$Zn

Comparative Polymerization Examples 1 to 3

The yellow solution produced in Comparative Initiator Production Example 1 was added as an initiator to a flask containing (1-hexyl)$_2$Zn (22.6 mg, 96 μmol) and methylcyclohexane (27 g) inside a glove box, in accordance with the amount shown in Table 2 below. Styrene (5.0 g, 48.0 mmol) was added, and anionic polymerization was performed at 90° C. for 5 hours. Subsequently, an HCl aqueous solution (2 N, 0.3 mL) was added, and the generated solution was stirred for 30 minutes at 90° C. to destroy the zinc compound. The solution was filtered through a short pad of silica gel and then washed with toluene. In order to separate PS, toluene was removed by a rotary evaporator. The separated sample was dried in a vacuum oven at 130° C. for 5 hours (5.00 g, 100%).

Comparative Polymerization Example 4

The same processes as in Comparative Polymerization Examples 1 to 3 were performed, except that the compound produced in Comparative Initiator Production Example 2 was used as an initiator in accordance with the amount shown in Table 2 below.

Comparative Polymerization Example 5

The same processes as in Comparative Polymerization Examples 1 to 3 were performed, except that the compound produced in Comparative Initiator Production Example 3 was used as an initiator in accordance with the amount shown in Table 2 below.

Comparative Polymerization Examples 6 to 8

The same processes as in Comparative Polymerization Examples 1 to 3 were performed, except that the compound produced in Comparative Initiator Production Example 4 was used as an initiator in accordance with the amount shown in Table 2 below.

Comparative Polymerization Examples 9 to 11

The same processes as in Comparative Polymerization Examples 1 to 3 were performed, except that the compound produced in Comparative Initiator Production Example 5 was used as an initiator in accordance with the amount shown in Table 2 below.

Comparative Polymerization Example 12

The same processes as in Comparative Polymerization Examples 1 to 3 were performed, except that n-BuLi·(PMDTA) was used as an initiator in accordance with the amount shown in Table 2 below.

Comparative Polymerization Example 13

The same processes as in Comparative Polymerization Examples 1 to 3 were performed, except that Me$_3$SiCH$_2$Li·(PMDTA) was used as an initiator in accordance with the amount shown in Table 2 below.

Polymerization Examples 1 to 3

The same processes as in Comparative Polymerization Examples 1 to 3 were performed, except that the compound produced in Initiator Production Example 1 was used as an initiator in accordance with the amount shown in Table 2 below.

TABLE 2

|  | Initiator | Li (μmol) | Yield (g, %) | Mn (Da) | Mw/Mn | Number of PS growing sites (μmol) |
|---|---|---|---|---|---|---|
| Polymerization Example 1 | Initiator Production Example 1 | 50 | 5.00; 100 | 21,500 | 1.28 | 233 |
| Polymerization Example 2 | Initiator Production Example 1 | 70 | 5.00; 100 | 20,800 | 1.24 | 240 |
| Polymerization Example 3 | Initiator Production Example 1 | 100 | 5.00; 100 | 19,400 | 1.30 | 258 |
| Comparative Polymerization Example 1 | Comparative Initiator Production Example 1 | 50 | 4.69; 94 | 22,900 | 1.45 | 205 |
| Comparative Polymerization Example 2 | Comparative Initiator Production Example 1 | 70 | 4.62; 92 | 22,800 | 1.39 | 203 |
| Comparative Polymerization Example 3 | Comparative Initiator Production Example 1 | 100 | 4.82; 96 | 23,800 | 1.35 | 203 |
| Comparative Polymerization Example 4 | Comparative Initiator Production Example 2 | 100 | 4.75; 95 | 19,700 | 1.25 | 240 |
| Comparative Polymerization Example 5 | Comparative Initiator Production Example 3 | 100 | 1.14; 23 | 7,400 | 2.10 | 154 |
| Comparative Polymerization Example 6 | Comparative Initiator Production Example 4 | 50 | 4.56; 91 | 21,000 | 1.32 | 217 |
| Comparative Polymerization Example 7 | Comparative Initiator Production Example 4 | 70 | 4.63; 93 | 22,300 | 1.33 | 208 |
| Comparative Polymerization Example 8 | Comparative Initiator Production Example 4 | 100 | 4.67; 93 | 24,000 | 1.27 | 195 |

TABLE 2-continued

| | Initiator | Li (μmol) | Yield (g, %) | Mn (Da) | Mw/Mn | Number of PS growing sites (μmol) |
|---|---|---|---|---|---|---|
| Comparative Polymerization Example 9 | Comparative Initiator Production Example 5 | 50 | 5.00; 100 | 22,000 | 1.30 | 227 |
| Comparative Polymerization Example 10 | Comparative Initiator Production Example 5 | 70 | 4.98; 99 | 21,100 | 1.27 | 236 |
| Comparative Polymerization Example 11 | Comparative Initiator Production Example 5 | 100 | 4.98; 99 | 21,000 | 1.24 | 237 |
| Comparative Polymerization Example 12 | Comparative Initiator Production Example 6 | 100 | 4.96; 99 | 21,000 | 1.48 | 236 |
| Comparative Polymerization Example 13 | Comparative Initiator Production Example 7 | 100 | 5.00; 100 | 23,000 | 1.25 | 217 |

As shown in Table 2, an organolithium compound that might be generated by the reaction of Li, olefin, and PMDTA was used as an initiator for styrene polymerization in the presence of (1-hexyl)$_2$Zn. The generated or produced organolithium compound was supplied to a polymerization pot containing styrene (5.0 g) and (1-hexyl)$_2$Zn (100 μmol) in methylcyclohexane, and polymerization was performed at 90° C. for 5 hours. The number of PS chain-growing sites was calculated by dividing the weight of the separated PS by the measured Mn value, and whether the PS chain was well grown from (1-hexyl)$_2$Zn was monitored.

When pentylallyl-Li·(PMDTA) generated by the in-situ reaction of "n-BuLi+PMDTA" in 1-octene was used (Polymerization Examples 1 to 3), styrene monomers were completely converted into PS, and the number of PS chain-growing sites exceeded the value of "2×Zn (μmol)" (233, 240, and 258 μmol, respectively) and was increased with the increase in the supplied amount (50, 70, and 100 μmol, respectively) of the lithium compound. Such observation results indicate that the PS chains were grown not only from all Zn sites, but also from some portions of the supplied organolithium compound as shown in Reaction Formula 3 below.

[Reaction Formula 3]

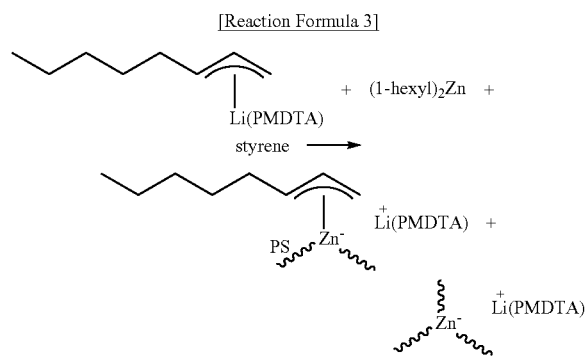

When Me$_2$NCH$_2$CH$_2$N(Me)CH$_2$CH$_2$N(Me)CH$_2$Li (100 μmol) generated within 30 minutes in the reaction of "sec-BuLi+PMDTA in methylcyclohexane" was used (Comparative Polymerization Example 4), styrene monomers were not completely converted into PS (yield of 95%), the calculated number of PS chain-growing sites was 240 μmol, which exceeded the value of "2×Zn (μmol)" but did not exceed the value of "2×Zn (μmol)+Li (μmol)", and the molecular weight distribution was narrow (Mw/Mn of 1.25). When Me$_2$NCH$_2$CH$_2$N(Me)Li was used (Comparative Polymerization Example 5), the conversion rate of styrene was significantly low (23%). Meanwhile, when Me$_2$NCH$_2$CH$_2$N(Me)Li·(PMDTA) was used (Comparative Polymerization Examples 6 to 8), the conversion rate was high but the yield was not high (yield of 91% to 93%). The number of PS chains was well agreed with the value of "2×Zn (μmol)" (207, 208, and 195 μmol vs. 2×100 μmol). This was hardly affected by the increase in the supplied amount of the lithium species (50, 70, and 100 μmol, respectively), indicating that the PS chains were grown selectively from the supplied Zn compounds and were not grown from Me$_2$NCH$_2$CH$_2$N(Me)Li.

PhLi·(PMDTA) showed similar results to pentylallyl-Li, and exhibited similar effects to Me$_3$SiCH$_2$Li·(PMDTA) (Comparative Polymerization Example 13) and n-BuLi·(PMDTA) (Comparative Polymerization Example 12). Styrene monomers were quantitatively converted into PS, and the numbers of PS chains exceeded the value (220 to 260 μmol) of "2×Zn (μmol)" in all cases. The molecular weight distributions in the cases of pentylallyl-Li·(PMDTA), PhLi·(PMDTA), and Me$_3$SiCH$_2$Li·(PMDTA) were narrow (Mw/Mn of 1.24 to 1.30), and the molecular weight distribution in the case of n-BuLi·(PMDTA) was rather broad (Mw/Mn of 1.48).

Polymerization Experimental Example 2—Polymerization of Poly(Ethylene-Co-Polypropylene)-b-PS Polymerization Example A A bomb reactor (125 mL) was evacuated at 60° C. for 1 hour. The reactor was filled with ethylene gas at atmospheric pressure, and then a solution of Me$_3$Al (29.0 mg, 200 μmol-Al) in methylcyclohexane (15.5 g) was added. The mixture was stirred for 40 minutes at 100° C. using a mantle, and then the solution was removed using a cannula. The reactor was evacuated again to remove any residual solvent, and filled with ethylene/propylene mixed gas at atmospheric pressure. This washing procedure was performed to remove catalyst poison. The reactor was charged with methylcyclohexane (15.5 g) containing modified methylaluminoxane (MMAO, AkzoNobel, 6.7 wt %-Al in heptane, 20 mg, 50

µmol-Al), and the temperature was set to 80° C. A solution of (1-hexyl)₂Zn (35.4 mg, 150 µmol-Zn) in methylcyclohexane (10.0 g), and a solution containing a transition metal compound catalyst represented by Formula 7 below and [(C₁₈H₃₇)N(Me) H⁺[B (C₆F₅)₄]⁻ as a co-catalyst in cyclohexane (1.8 µmol/g, 230 mg, 2.0 µmol) diluted with methylcyclohexane (0.5 g) were successively injected.

[Formula 7]

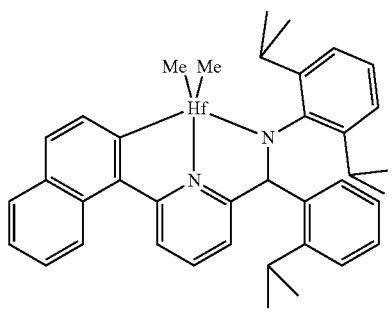

The reactor was filled with ethylene/propylene mixed gas (10 bar/15 bar, and 25 bar in total) from a tank at 25 bar, and the mixture was polymerized for 40 minutes. The temperature spontaneously increased to 110° C. within 5 minutes, and then was maintained at 90° C. to 100° C. using a controller. When the pressure in the tank was decreased from 23 bar to 21 bar, the remaining ethylene/propylene mixed gas was discharged, and an aliquot was taken for GPC measurement.

Pentylallyl-Li·(PMDTA) (200 µmol) in methylcyclohexane (10.0 g) was injected at 95° C. After stirring for 15 minutes at 95° C., a solution of styrene (5.0 g) in methylcyclohexane (5.0 g) was injected, and the mixture was polymerized for 4 hours while controlling the temperature within the range of 90° C. to 100° C. An aliquot was taken for ¹H NMR spectroscopy. The spectrum showed no signal due to the styrene monomer.

Acetic acid (2.0 mL) and ethanol (30 mL) were successively injected into the reactor. The generated polymer was dried in a vacuum oven at 160° C. (18.1 g). The polymer (3.0 g) was dissolved in chloroform (30 g) at 60° C. for 3 hours, and then acetone (60 g) was added to precipitate PO-block-PS. Homo-PS soluble in a chloroform/acetone mixed solvent was separated by filtration.

Polymerization Example B

The same processes as in Polymerization Example A were performed, except that the amount of the styrene was changed to 10 g.

Polymerization Example C

The same processes as in Polymerization Example A were performed, except that the amount of the (1-hexyl)₂Zn was changed to 300 µmol.

Polymerization Example D

The same processes as in Polymerization Example C were performed, except that the amount of the styrene was changed from 5.0 g to 10 g.

Comparative Polymerization Example A

The same processes as in Polymerization Example A were performed, except that the initiator produced in Comparative Initiator Production Example 1 was used instead of pentylallyl-Li·(PMDTA).

Comparative Polymerization Example B

The same processes as in Polymerization Example A were performed, except that the initiator produced in Comparative Initiator Production Example 2 was used instead of pentylallyl-Li·(PMDTA).

Comparative Polymerization Example C

The same processes as in Polymerization Example A were performed, except that the initiator produced in Comparative Initiator Production Example 4 was used instead of pentylallyl-Li·(PMDTA).

Comparative Polymerization Example D

The same processes as in Polymerization Example A were performed, except that the initiator produced in Comparative Initiator Production Example 5 was used instead of pentylallyl-Li·(PMDTA).

Comparative Polymerization Example E

The same processes as in Comparative Polymerization Example D were performed, except that the amount of the styrene was changed from 5.0 g to 10 g.

Comparative Polymerization Example F

The same processes as in Comparative Polymerization Example D were performed, except that the amount of the (1-hexyl)₂Zn was changed to 300 µmol.

Comparative Polymerization Example G

The same processes as in Polymerization Example F were performed, except that the amount of the styrene was changed from 5.0 g to 10 g.

Comparative Polymerization Example H

The same processes as in Polymerization Example A were performed, except that n-BuLi·(PMDTA) was used instead of pentylallyl-Li·(PMDTA).

Comparative Polymerization Example I

The same processes as in Polymerization Example A were performed, except that Me₃SiCH₂Li·(PMDTA) was used instead of pentylallyl-Li·(PMDTA).

TABLE 3

| | Initiator | (1-Hexyl)$_2$Zn (μmol) | PO (g); F$_{c3}$ (mol %) | PS (g); Homo fraction (%) | Homo-Ps Mn (kDa); PDI | Mn (kDa); PDI before styrene polymerization | Mn (kDa); PDI after styrene polymerization |
|---|---|---|---|---|---|---|---|
| Polymerization Example A | Initiator Production Example 1 | 150 | 13.1; 17 | 5.0; 29 | 16 (1.25) | 60 (1.61) | 82 (1.39) |
| Polymerization Example B | Initiator Production Example 1 | 150 | 13.5; 21 | 10; 28 | 27 (1.24) | 62 (1.61) | 99 (1.30) |
| Polymerization Example C | Initiator Production Example 1 | 300 | 14.2; 22 | 5.0; 27 | 11 (1.23) | 40 (1.50) | 51 (1.35) |
| Polymerization Example D | Initiator Production Example 1 | 300 | 13.0; 19 | 10; 28 | 16 (1.24) | 35 (1.54) | 54 (1.26) |
| Comparative Polymerization Example A | Comparative Initiator Production Example 1 | 150 | 15.6; 22 | 5.0; 29 | 24 (1.41) | 61 (1.75) | 66 (1.64) |
| Comparative Polymerization Example B | Comparative Initiator Production Example 2 | 150 | 12.4; 21 | About 0 | 0 | 60 (1.65) | 59 (1.65) |
| Comparative Polymerization Example C | Comparative Initiator Production Example 4 | 150 | 15.9; 23 | 3.5; 30 | 39 (2.77) | 60 (1.76) | 64 (1.70) |
| Comparative Polymerization Example D | Comparative Initiator Production Example 5 | 150 | 15.2; 24 | 5.0; 30 | 20 (1.52) | 64 (1.65) | 76 (1.49) |
| Comparative Polymerization Example E | Comparative Initiator Production Example 5 | 150 | 13.0; 17 | 10; 34 | 28 (1.39) | 67 (1.63) | 105 (1.29) |
| Comparative Polymerization Example F | Comparative Initiator Production Example 5 | 300 | 12.0; 22 | 5.0; 30 | 11 (1.40) | 33 (1.58) | 43 (1.41) |
| Comparative Polymerization Example G | Comparative Initiator Production Example 5 | 300 | 14.8; 23 | 10; 33 | 16 (1.38) | 38 (1.64) | 59 (1.34) |
| Comparative Polymerization Example H | Comparative Initiator Production Example 6 | 150 | 14.6; 24 | 5.0; 45 | 23 (1.33) | 63 (1.73) | 71 (1.65) |
| Comparative Polymerization Example I | Comparative Initiator Production Example 7 | 150 | 16.0; 21 | 5.0; 27 | 19 (1.35) | 71 (1.59) | 76 (1.49) |

Figure 13:
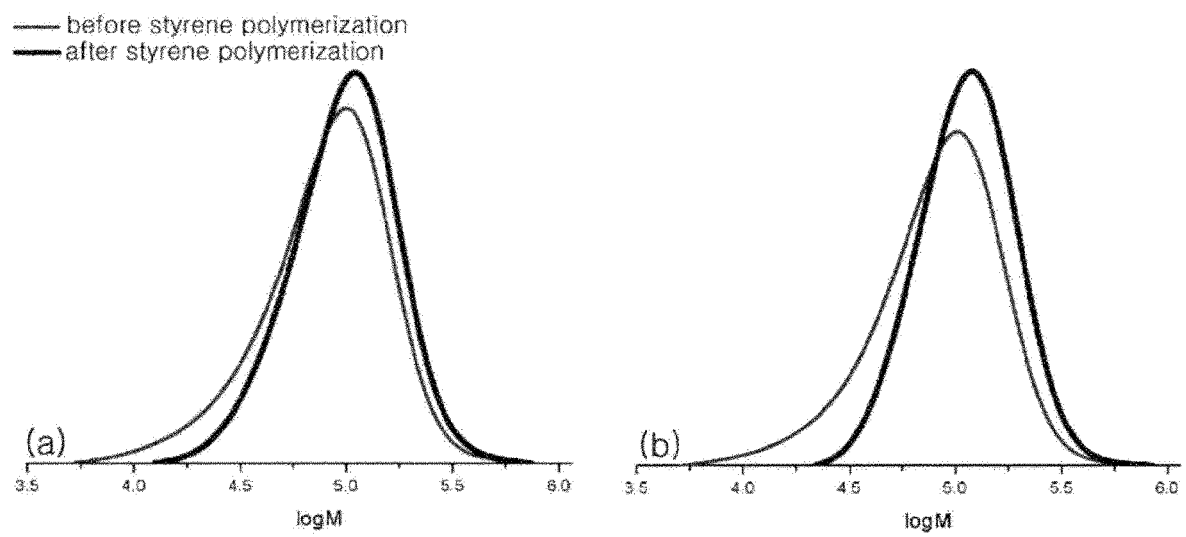
FIG. 13 shows GPC measurement results [(a) Polymerization Example A and (b) Polymerization Example B] before (thin curve) and after (thick curve) styrene polymerization using pentylallyl-Li·(PMDTA) as an initiator.
Figure 14:
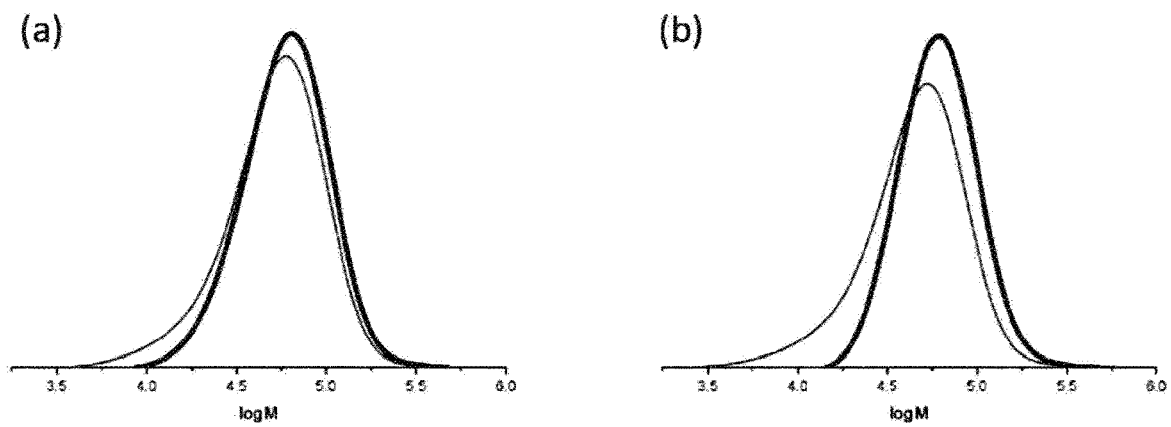
FIG. 14 shows GPC measurement results [(a) Polymerization Example C and (b) Polymerization Example D] before (thin curve) and after (thick curve) the styrene polymerization using pentylallyl-Li·(PMDTA) as an initiator.

In Polymerization Examples A to D, pentylallyl-Li·(PMDTA) generated by the reaction of "n-BuLi+PMDTA" in 1-octene was used as an initiator, and with reference to FIG. 13 and FIG. 14, it can be confirmed that the GPC curves were shifted to a high-molecular-weight direction after the styrene polymerization. The increase in the Mn value after the styrene polymerization was substantial and reasonable (ΔMn of 22, 37, 11, and 20 kDa, respectively). By supplying twice the amount of styrene monomers under the same conditions, the ΔM value could be almost doubled from 22 kDa to 33 kDa and from 11 kDa to 20 kDa. By supplying twice the amount of the Zn compound through the CCTcoP polymerization under the same conditions, and accordingly supplying twice the amount of the lithium compound, the ΔM value could be reduced by almost half from 22 kDa to 11 kDa and from 37 kDa to 20 kDa. Moreover, the molecular weight distributions after the styrene polymerization were narrowed from the Mw/Mn values of 1.61, 1.61, 1.50, and 1.54, to the Mw/Mn values of 1.39, 1.30, 1.35, and 1.26, respectively (ΔPDI of 0.22, 0.31, 0.15, and 0.28).

Homo-PS could be separated from the block copolymer by extraction with an acetone/chloroform mixed solvent. The extracted homo-PS was about ⅓ (27% to 29%) of the total amount of the consumed styrene, and this made it possible to hypothesize that the PS chains were grown from polyolefinyl and pentylallyl groups in [(polyolefinyl)$_2$(pentylallyl)Zn]$^-$[Li·(PMDTA)]$^+$, which is a zincate compound formed by the action of pentylallyl-Li·(PMDTA) on (polyolefinyl)$_2$Zn.

The growth of the PS chain from the polyolefinyl group results in the generation of a desired poly(ethylene-co-propylene)-block-PS, while the growth of the PS chain from pentylallyl results in the generation of the homo-PS in an amount of ⅓ of the total amount of the consumed styrene. However, the number of the PS chain-growing sites calculated by dividing the total weight of the consumed styrene by the measured Mn value of the homo-PS was not agreed with the value of "3×Zn (μmol)", contrary to the hypothesis. Meanwhile, the number of the PS chain-growing sites was close to the value of "2×Zn (μmol)" (in the cases of Polymerization Examples A and B, 310 and 360 µmol vs. 2×150=300 µmol; and in the case of Polymerization Example D, 630 µmol vs. 2×300=600 µmol).

Therefore, the present inventors hypothesized that the PS chains were grown mainly from polyolefinyl groups in [(polyolefinyl)$_2$(pentylallyl)Zn]$^-$[Li·(PMDTA)]$^+$, which is the formed zincate, as shown in Reaction Formula 4 below.

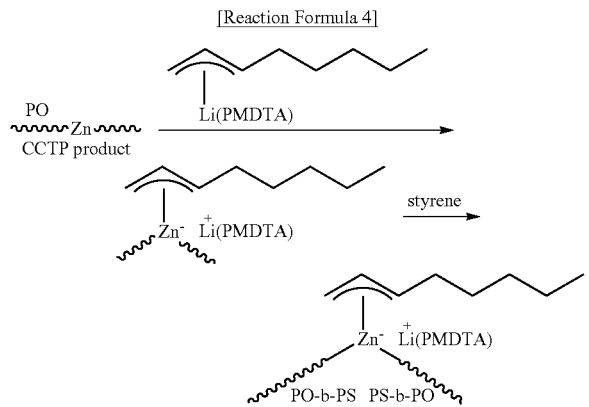

[Reaction Formula 4]

It is thought that the extracted homo-PS was attributed to the PS chains grown from the 1-hexyl group, which may remain intact during CCTP, or from the polyolefin group generated in CCTP. When the supplied amount of the Zn compound was large (300 µmol) and the supplied amount of the styrene monomers is too small (5.0 g) (Polymerization Example C), the number of the PS chain-growing sites did not exceed the value of "2×Zn", indicating that the PS chains were not grown from all the polyolefinyl-Zn groups (450 µmol vs. 2×300=600 µmol). The molecular weight distribution of the extracted homo-PS was significantly narrow (Mw/Mn of 1.23 to 1.25), and thus it could be confirmed that the anionic styrene polymerization was well controlled.

Figure 15:
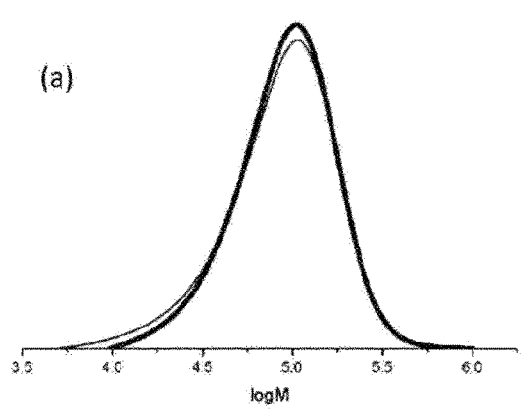
FIG. 15 shows GPC measurement results [(a) Comparative Polymerization Example D, (b) Comparative Polymerization Example E, (c) Comparative Polymerization Example F, and (d) Comparative Polymerization Example G] before (thin curve) and after (thick curve) the styrene polymerization using pentylallyl-Li·(PMDTA) as an initiator.
Figure 15:
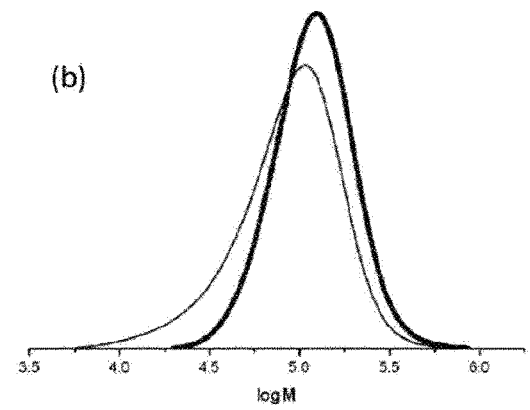
Figure 15:
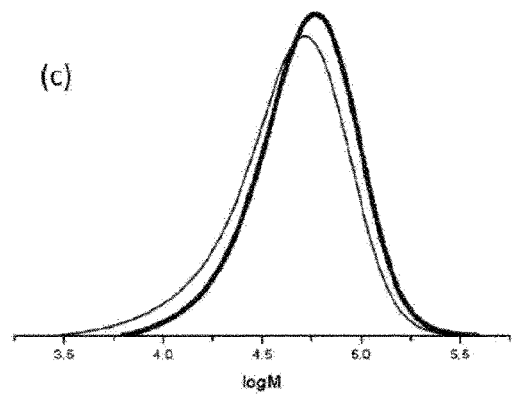
Figure 15:
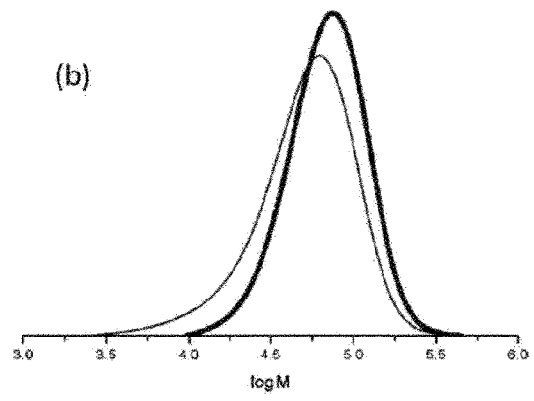

In the case of PhLi·(PMDTA), as can be seen in FIG. 15, the increases in the Mn values after the styrene polymerization were significant (ΔMn of 12, 38, 10, and 21 kDa, Comparative Polymerization Examples D to G), and the molecular weight distributions Mw/Mn after the styrene polymerization were significantly narrowed from 1.65, 1.63, 1.58, and 1.64, to 1.49, 1.29, 1.41, and 1.34, respectively. However, the amount of the extracted homo-PS was larger (30% to 34% vs. 27% to 29%) than that of pentylallyl-Li·(PMDTA), which is an initiator example, and the molecular weight distribution of the extracted homo-PS was wider than that in the case of using pentylallyl-Li·(PMDTA).

From the results, it could be confirmed that pentylallyl-Li·(PMDTA), which is an initiator example, exhibits a superior effect to PhLi·(PMDTA), which is a comparative initiator, in growing the PS chains from (polyolefinyl)$_2$Zn.

Meanwhile, it could be considered that in the PS polymerization from (1-hexyl)$_2$Zn, no significant effect difference between pentylallyl-Li·(PMDTA), which is an initiator example, and n-BuLi·(PMDTA) and Me$_3$SiCH$_2$Li·(PMDTA), which are comparative initiators, was observed (see Table 2), but in the results of the PS polymerization performed with (polyolefinyl)$_2$Zn in which the block copolymer is actually produced, it could be confirmed that pentylallyl-Li·(PMDTA), which is an initiator example, exhibits a superior effect. Specifically, in the case of Comparative Polymerization Example H in which n-BuLi·(PMDTA) was used, a significant amount of homo-PS was generated (45%), and in the case of Comparative Polymerization Example I in which Me$_3$SiCH$_2$Li·(PMDTA) was used, the increase in the Mn value after the styrene polymerization was smaller compared to the cases of Polymerization Examples in which the initiator examples were used.

The invention claimed is:

1. A method for producing a polyolefin-polystyrene block copolymer, the method comprising a step of polymerizing styrene in the presence of the anionic polymerization initiator represented by Formula 1 below:

[Formula 1]

in formula 1,
R$_1$ is hydrogen or a hydrocarbon group having 1 to 20 carbon atoms, and
A is a compound represented by Formula 2 below,

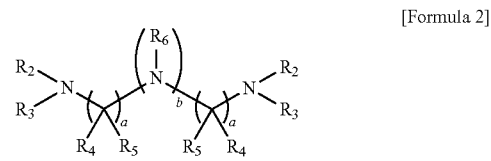

[Formula 2]

in Formula 2,
R$_2$ to R$_6$ are each independently hydrogen or a hydrocarbon group having 1 to 20 carbon atoms, and
a and b are each independently an integer of 0 to 3, and a and b are not 0 at the same time.

2. The method for producing a polyolefin-polystyrene block copolymer of claim 1, wherein the polymerization of styrene is performed in the further presence of (polyolefinyl)$_2$Zn.

* * * * *